(12) United States Patent
de Quehen et al.

(10) Patent No.: US 10,880,278 B1
(45) Date of Patent: Dec. 29, 2020

(54) BROADCASTING IN SUPERSINGULAR ISOGENY-BASED CRYPTOSYSTEMS

(71) Applicant: ISARA Corporation, Waterloo (CA)

(72) Inventors: Victoria de Quehen, Waterloo (CA); Edward William Eaton, Waterloo (CA); Gustav Michael Gutoski, Waterloo (CA); Christopher Leonardi, Waterloo (CA)

(73) Assignee: ISARA Corporation, Waterloo (CA)

( * ) Notice: Subject to any disclaimer, the term of this patent is extended or adjusted under 35 U.S.C. 154(b) by 0 days.

(21) Appl. No.: 16/591,980

(22) Filed: Oct. 3, 2019

(51) Int. Cl.
*H04L 9/08* (2006.01)
*H04L 29/06* (2006.01)
(Continued)

(52) U.S. Cl.
CPC ............ *H04L 63/0435* (2013.01); *H04L 9/06* (2013.01); *H04L 9/0822* (2013.01);
(Continued)

(58) Field of Classification Search
CPC . H04L 63/0435; H04L 63/064; H04L 9/3073; H04L 9/3066; H04L 9/0861; H04L 9/0819
See application file for complete search history.

(56) References Cited

U.S. PATENT DOCUMENTS 7,499,544 B2   3/2009   Jao et al.
7,983,422 B2   7/2011   Kent et al.
(Continued)

FOREIGN PATENT DOCUMENTS

WO   WO-2019056103 A1 *   3/2019   ............... G06F 7/72

OTHER PUBLICATIONS

"Three-pass protocol", Wikipedia, retrieved from https://en.wikipedia.org/w/index.php?title=Three-pass_protocol&oldid=860306504, Sep. 19, 2018, 3 pgs.
(Continued)

*Primary Examiner* — Ellen Tran
(74) *Attorney, Agent, or Firm* — Henry Patent Law Firm PLLC

(57) ABSTRACT

In some aspects, a key establishment protocol is executed to generate a shared secret. A first entity calculates a first image curve $E_B$ representing an image of an elliptic curve E under a first isogeny $\phi_B$; calculates the shared secret based on the first image curve $E_B$; receives a second image curve $E_A$ and a first pair of elliptic curve points $\{\phi_A(P_B), \phi_A(Q_B)\}$ and from a second entity; obtains a basis $\{R, S\}$; calculates a third image curve $E_{BA}$ representing an image of the second image curve $E_A$ under a second isogeny $\psi_B$; calculates a third pair of elliptic curve points $\{\psi_B(R), \psi_B(S)\}$; and sends the third image curve $E_{BA}$ and the third pair of elliptic curve points $\{\psi_B(R), \psi_B(S)\}$ to the second entity, wherein the third image curve $E_{BA}$ and the third pair of elliptic curve points $\{\psi_B(R), \psi_B(S)\}$ enable the second entity to compute the shared secret.

30 Claims, 11 Drawing Sheets

(51) Int. Cl.
*H04L 9/32* (2006.01)
*H04L 9/30* (2006.01)
*H04L 9/06* (2006.01)

(52) U.S. Cl.
CPC .......... *H04L 9/0852* (2013.01); *H04L 9/0869* (2013.01); *H04L 9/0891* (2013.01); *H04L 9/3073* (2013.01); *H04L 9/3268* (2013.01); *H04L 63/0421* (2013.01); *H04L 63/064* (2013.01)

(56) References Cited

U.S. PATENT DOCUMENTS

| | | | |
|---|---|---|---|
| 8,856,531 B1* | 10/2014 | Robinson | H04L 9/0841 380/28 |
| 9,673,977 B1 | 6/2017 | Kalach | |
| 9,871,783 B2 | 1/2018 | Caceres et al. | |
| 10,116,443 B1 | 10/2018 | Kalach et al. | |
| 10,218,494 B1 | 2/2019 | De Quehen et al. | |
| 10,218,504 B1 | 2/2019 | Kalach et al. | |
| 10,313,124 B1 | 6/2019 | Kalach et al. | |
| 10,630,476 B1 | 4/2020 | De Quehen et al. | |
| 2004/0139029 A1 | 7/2004 | Zhang et al. | |
| 2006/0248338 A1 | 11/2006 | Jao et al. | |
| 2009/0210716 A1 | 8/2009 | Chen | |
| 2010/0082992 A1 | 4/2010 | Broker et al. | |
| 2010/0329454 A1 | 12/2010 | Takashima | |
| 2012/0210118 A1 | 8/2012 | Chaves et al. | |
| 2013/0297929 A1 | 11/2013 | Chaves et al. | |
| 2015/0003615 A1 | 1/2015 | Vanstone et al. | |
| 2016/0057114 A1* | 2/2016 | Unagami | H04L 63/0428 713/171 |
| 2016/0087802 A1 | 3/2016 | Peeters | |
| 2018/0026784 A1 | 1/2018 | Ward et al. | |
| 2018/0323973 A1 | 11/2018 | Soukharev | |

OTHER PUBLICATIONS

Azarderakhsh, et al., "Key Compression for Isogeny-Based Cryptosystems", https://eprint.iacr.org/2016/229, Mar. 1, 2016, 19 pgs.

Chen, et al., "Report on Post-Quantum Cryptography", National Institute of Standards and Technology (NIST), Apr. 2016, 15 pgs.

Costello, et al., "A simple and compact algorithm for SIDH with arbitrary degree isogenics", https://eprint.iacr.org/2017/504, 2017, 22 pgs.

Costello, et al., "Efficient algorithms for supersingular isogeny Diffie-Hellman", Annual Cryptology Conference; Springer, Berlin, Heidelberg, 2016, 38 pgs.

De Feo, et al., "Towards quantum-resistant cryptosystems from supersingular elliptic curve isogenies", J. Math. Cryptol. 8 (2014), 209-247, 2014, 39 pgs.

Dent, Alexander, "A Designer's Guide to KEMs", Cryptology ePrint Archive: Report 2002/174, Oct. 31, 2005, 28 pages.

Fujisaki, et al., "Secure Integration of Asymmetric and Symmetric Encryption Schemes", CRYPTO' 99, LNCS 1666, pp. 537-554, 1999, 18 pgs.

Galbraith, Steven, "On the Security of Supersingular Isogeny Cryptosystems", Cryptology ePrint Archive: Report 2016/859, Jan. 31, 2017, 21 pages.

Jao, et al., "Towards quantum-resistant cryptosystems from supersingular elliptic curve isogenies", PQCrypto'11 Proceedings of the 4th international conference on Post-Quantum-Cryptography, Nov. 29, 2011, 17 pgs.

Kiliç, et al., "Rivisiting Shamir's No-key Protocol: Lightweight Key Transport", 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress, 2017, 8 pgs.

Kirkwood, et al., "Failure is not an Option: Standardization Issues for Post-Quantum Key Agreement", Accessed online Nov. 29, 2017 at https://csrc.nist.gov/csrc/media/events/workshop-on-cybersecurity-in-a-post-quantum-world/documents/presentations/session7-motley-mark.pdf, 2015, 21 pgs.

Menezes, et al., "A Handbook of Applied Cryptography", CRC press, Oct. 1996, 794 pgs.

Srinath, et al., "Isogeny-Based Quantum-Resistant Undeniable Blind Signature Scheme", Cryptology ePrint Archive: Report 2016/148, Feb. 16, 2016, 21 pgs.

Yang, et al., "Mutual authenticated quantum no-key encryption scheme over private quantum channel", arXiv:1502.02112v1, Feb. 7, 2015, 11 pgs.

USPTO, Notice of Allowance dated Jan. 15, 2020, in U.S. Appl. No. 16/591,972, 18 pgs.

USPTO, U.S. Appl. No. 16/591,972, 182 pgs.

Faz-Hernandez, et al., "A Faster Software Implementation of the Supersingular Isogeny Dithe-Hellman Key Exchange Protocol", IEEE Transactions on Computers (vol. 67, Issue 11), Nov. 2018, 15 pgs.

CIPO, International Search Report and Written Opinion dated Jun. 5, 2020, in PCT/CA2020/050063, 10 pgs.

WIPO, International Search Report and Written Opinion dated Jun. 17, 2020, in PCT/CA2020/050062, 12 pgs.

* cited by examiner

US 10,880,278 B1

BROADCASTING IN SUPERSINGULAR ISOGENY-BASED CRYPTOSYSTEMS

BACKGROUND

The following description relates to broadcasting solutions for supersingular isogeny-based cryptographic protocols.

Cryptography systems are used to communicate securely over public channels. For example, some cryptography systems provide confidentiality by encrypting messages, and some cryptography systems provide authenticity through digital signatures. Some cryptography systems operate using public keys, private keys and shared secrets.

DETAILED DESCRIPTION

Figure 1:
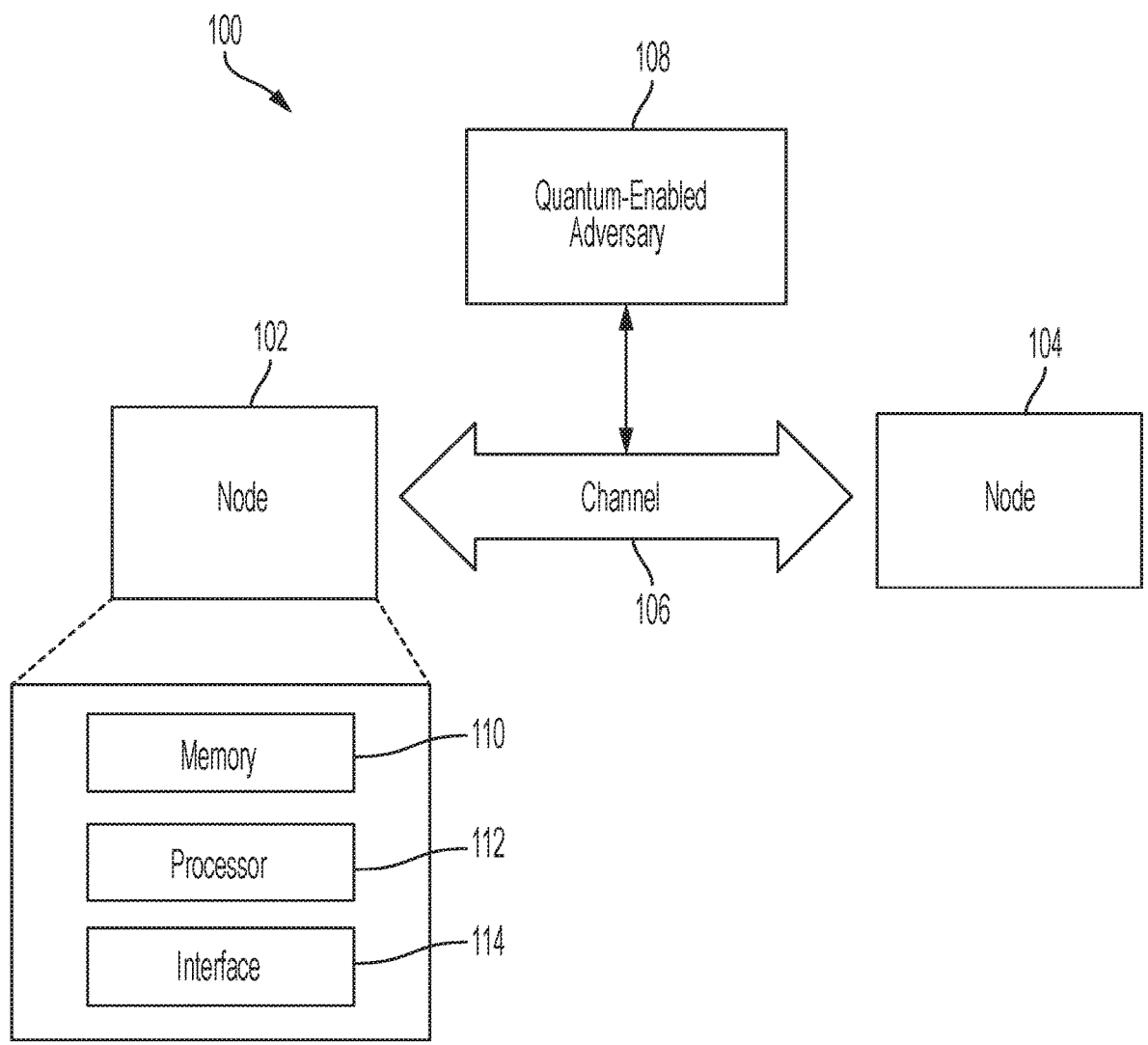
FIG. 1 is a block diagram showing aspects of an example communication system.

In some conventional key establishment protocols, including Diffie-Hellman, elliptic curve Diffie-Hellman (ECDH) and supersingular isogeny-based Diffie-Hellman (SIDH), both parties contribute randomness towards the choice of a shared secret key. In broadcast transmissions, where there is a single broadcaster and a large number of receivers, the broadcaster may wish to create a secret key without input from the receiving parties. As there is a single key, the broadcaster can encrypt a large amount of data and send it once, instead of needing to complete a separate encryption for each user. The challenge is to securely and efficiently send the shared secret key to valid users. In some examples described below, a party executes an isogeny-based cryptography protocol to create a secret key that may be transported to multiple users. In some examples, the broadcaster can update the shared secret key and distribute the (new) updated key to some, but not necessarily all, of these users, without needing additional information from the users.

Accordingly, in certain contexts (e.g., in the setting of broadcasting information to multiple recipients and in other scenarios), it is useful for one party to choose the secret key alone. This allows the party to create a single shared secret key without knowing anything about who the users are, nor how many users there are. In some cases, because there is a single key, the party (e.g., a broadcaster) can encrypt a large amount of data and send it once, instead of needing to complete a separate encryption for each user.

For example, suppose a cable company, streaming service, or other content provider wishes to send a large amount of encrypted data to a large number of users. The content provider would like to do the encryption only once, as the content provider is streaming a large amount of information. They would also like to create the shared secret key without input from the users, and without knowing any information about the users, nor how many users there are. The content provider will also want to be able to add users at arbitrary times. As well, the content provider would like to update their shared secret key from time to time (e.g., monthly or otherwise). The content provider would like to transport the new key to the users who have renewed their monthly subscription without requiring the users to provide additional information. The content provider would like to have revocation scheme, which allows the content provider to revoke the users who have not renewed their subscription, and prevents those users from having a copy of the updated key. These problems can be considered a key distribution problem where one party wishes to distribute a shared secret to a potentially large number of other parties, and the party would also like to be able to distribute an updated shared secret to a certain subset of those parties, and revoke other parties.

The rapid development of quantum computers threatens the security of existing solutions to the problems outlined above. At least some of the examples described below may provide a significant security improvement by using quantum-safe algorithms for a party to securely create and transmit a secret key to multiple users. In some cases, one or more of the algorithms described below allow the party to transmit a new, updated key to some, but not all, of those users.

Quantum computers are being developed today in a variety of commercial, research and academic settings. Significant advances in quantum computers would threaten classical cryptography. Thus, cryptography that would be immune to an attack by an adversary having access to a large-scale quantum computer would address a significant security vulnerability. More specifically, there are algorithms that could be run on a large-scale quantum computer that could be used to solve the discrete log problem and to factor integers. Hence, with the looming threat of large-scale quantum computers, we would like to have cryptographic protocols that are not based on the difficulty of solving the discrete log problem nor factoring integers.

One type of cryptography system that is believed to be secure against large-scale quantum computing uses isogenies between supersingular elliptic curves. Specific examples of such isogeny-based cryptography systems that are believed to be quantum-secure include supersingular isogeny Diffie Hellman (SIDH) key agreement and supersingular isogeny key encapsulation (SIKE).

In some implementations, an elliptic curve is a curve defined by a non-singular, cubic curve in two variables. The points on an elliptic curve form a well-known group under the "chord and tangent" rule. A rational map of curves is a function where the coordinate functions are defined by ratios of polynomials. An isogeny is a rational map between elliptic curves that is also a group homomorphism. Isogenies are typically defined up to isomorphism by their kernels. More specifically, if a subgroup K is chosen, then it is possible to use Vélu's formulas to construct the image of an isogeny that has K as a kernel. Conversely, however, from the image of an isogeny one cannot easily find the kernel.

One useful way to create a kernel is to use a point of order n on the elliptic curve for some integer n. The points whose order divides n are called n-torsion points. For a supersingular elliptic curve E whose coefficients are in $F_{p^2}$, where $F_{p^2}$ denotes a finite field of characteristic p with $p^2$ elements, the set of n-torsion points in $F_{p^2}$ form a group isomorphic to $Z_n \times Z_n$. In some conventional isogeny-based cryptography protocols (e.g., supersingular isogeny Diffie-Hellman (SIDH), as described in De Feo, L., et al, "Towards quantum-resistant cryptosystems from supersingular elliptic curve isogenies," Journal of Mathematical Cryptology 8 (no. 3), pp. 209-247, 2014), the set-up is as follows: Let p be a prime of the form $1_A^{e_A} 1_B^{e_B} \pm 1$, where $1_A$ and $1_B$ are distinct primes. Choose a supersingular elliptic curve E whose coefficients are in $F_{p^2}$. Let $\{P_A, Q_A\}$ be a basis of the $1_A$-torsion points of E, and $\{P_B, Q_B\}$ be a basis of the $1_B$-torsion points of E. Make all of these ($1_A$, $1_B$, p, E, $P_A$ and $Q_A$) public parameters. Various protocols may then be executed using these system parameters.

In some aspects of what is described here, isogeny-based cryptography protocols provide one or more advantages and improvements over existing technologies (which may be useful, e.g., in a broadcast setting or other contexts). In certain examples, an entity ("Bob") creates a secret key and encrypts data using the secret key. After creating this secret key, Bob can securely transmit the key to multiple parties, possibly at different times. Bob can easily update his key. For example, a content provider might want to change its key once a month, so that only those customers who have renewed their subscription have access to the new material. Bob can send an encoded version of the updated key in a way that some, but possibly not all, of the receiving parties are able to decode the new key. Moreover, Bob can update his key without requiring any of the receiving parties to provide Bob with additional information. This way Bob can send the updating information publicly, for example, by appending it to one of his messages. In some instances, the protocol creates a type of transcript, which is generated using information that is only known to Bob. The transcript can be used to provide proof that Bob gave the shared secret key to the other entities ("Alice").

In some implementations of the examples described below, an isogeny-based protocol sends enough information via extra points so that each party can create the necessary isogenies for the protocol to work. In some implementations of the examples described below, an isogeny-based protocol uses a map $\phi_A$ that is dependent on an image curve $E_B$. In addition, isogeny-based cryptographic algorithms may use smaller keys (e.g., compared to some other quantum-safe cryptographic algorithms), which can provide better memory and system efficiency. In some implementations, an isogeny-based cryptography protocol produces a transcript that is related to the seed $r_B$ that generates the image curve $E_B$ and hence the symmetric encryption key. In addition, the key derived between Bob and each Alice may be used directly for symmetric encryption of the payload data. This feature of the system can eliminate the extra step of needing to encrypt and decrypt the true payload secret by Bob and the Alices.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.), block chain systems, and other classes of technology that utilize cryptography. For example, a wide variety of modern technologies rely on computer-implemented cryptosystems for secure operation, and the techniques described here can improve such computer-implemented cryptosystems, for example, making them more computationally efficient or providing other advantages in some instances.

FIG. 1 is a block diagram showing aspects of an example communication system 100. The example communication system 100 shown in FIG. 1 includes two nodes 102, 104. The nodes 102, 104 use a supersingular isogeny-based cryptosystem to communicate with each other over a channel 106. The nodes 102, 104 represent distinct entities in the cryptosystem.

In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, IoT devices, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

In the example shown in FIG. 1, the entities represented by the nodes 102, 104 may correspond to a computing device, a computer system, a MAC address, an IP address or other network address, or another type of computer-readable identifier or instance of a computer resource. Accordingly, the computations and other operations of each entity may be performed by one or more processors or other elements of the respective node 102, 104. Similarly, information sent to or received by an entity may be sent to or received by an element (e.g., one or more processors, memories, or interfaces) of the respective node 102, 104.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or more of FIGS. 2, 3, 4, 5, 6, 7, 8, 9, 10 and 11.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIGS. 2, 3, 4, 5, 6, 7, 8, 9, 10 and 11.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using a wireless protocol or standard. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubit encodings. In some implementations, the quantum-enabled adversary 108 can operate in a fault-tolerant regime, or the quantum-enabled adversary may operate below the fault-tolerant regime.

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptography systems. For example, the quantum-enabled adversary 108 may be capable of computing prime factors (e.g., using Shor's factoring algorithm) fast enough to compromise certain RSA-based cryptography systems or computing discrete logarithms fast enough to compromise certain ECC-based cryptography systems. Accordingly, the example quantum-enabled adversary 108 can compromise the security of certain quantum-vulnerable cryptography systems (e.g., by computing a private key of a certificate authority or other entity based on public information).

In the example shown in FIG. 1, the nodes 102, 104 may use a quantum-resistant cryptography system that cannot be compromised by the example quantum-enabled adversary 108. For instance, the nodes 102, 104 may use a cryptography system that is secure against a quantum computer that can efficiently execute Shor's algorithm or other types of algorithms that are known to compromise the security of certain conventional cryptography standards.

In some implementations, the nodes 102, 104 use key establishment protocols (e.g., a key encapsulation mechanism (KEM) protocol, a broadcast protocol, etc.) that allows the nodes to establish a shared secret, and the key establishment protocols can be quantum-resistant schemes that are not vulnerable to the computing resources of the quantum-enabled adversary 108. In some implementations, the nodes 102, 104 use identification protocols that allows each node to prove its identity to the other node, and the identification protocols can be a quantum-resistant schemes that are not vulnerable to the quantum computing resources of the quantum-enabled adversary 108. Such key establishment protocols and identification protocols can be used in conjunction with digital signature schemes and encryption schemes that are also secure against attacks by the quantum-enabled adversary 108. For instance, the shared secret that is established by a quantum-safe key establishment protocol may be used for quantum-safe encryption schemes, quantum-safe signature schemes, etc.

In some examples, the nodes 102, 104 can use the example cryptographic processes shown in one or more of FIGS. 2, 3, 4, 5, 6, 7, 8, 9, 10 and 11, or the nodes 102, 104 may use variations of these and other techniques to communicate securely on the channel 106. In some examples, the cryptographic processes (e.g., those shown in FIGS. 2, 3, 4, 5, 6, 7, 8, 9, 10 and 11) are secure against quantum-enabled adversaries (e.g., the quantum-enabled adversary 108 shown in FIG. 1) as well as classically-enabled adversaries who do not have access to quantum computers or other quantum resources.

In the example cryptographic processes shown in FIGS. 2, 3, 4, 5, 6, 7, 8, 9, 10 and 11, values are generated, obtained and in some cases communicated by each of the nodes. For example, the nodes shown in FIGS. 3, 4, 5, 6, 7, and 9 may obtain integers, elliptic curves, image curves, elliptic curve points, image points, public and private keys, ciphertexts, shared secrets, and various representations of these and other cryptographic values in the various operations shown. Generally, each of these values can be computed or otherwise generated in any suitable manner, and each of these values can be stored or represented in any suitable form or format.

In some implementations of the cryptographic processes shown in FIGS. 2, 3, 4, 5, 6, 7, 8, 9, 10 and 11, a node obtains a value by retrieving the value from a remote or local memory or from another source; by invoking a specialized co-processor (e.g., a pseudorandom number generator, a cryptographic co-processor, a graphics processing unit, etc.) or another system to compute the value; by directly computing the value (e.g., by operation of a processor programmed by software, or another type of processor that is otherwise configured, to perform a computation that produces the value); or otherwise. In some examples, precomputed values, global system values of the cryptosystem, and other values can be received from memory (e.g., volatile or non-volatile memory); random integers or other random values can be received from a pseudorandom generator or another source; elliptic curve points, image curves, isogenies or values can be computed by a cryptographic co-processor, a general-purpose processor, or another type of processor in some cases.

Figure 2:
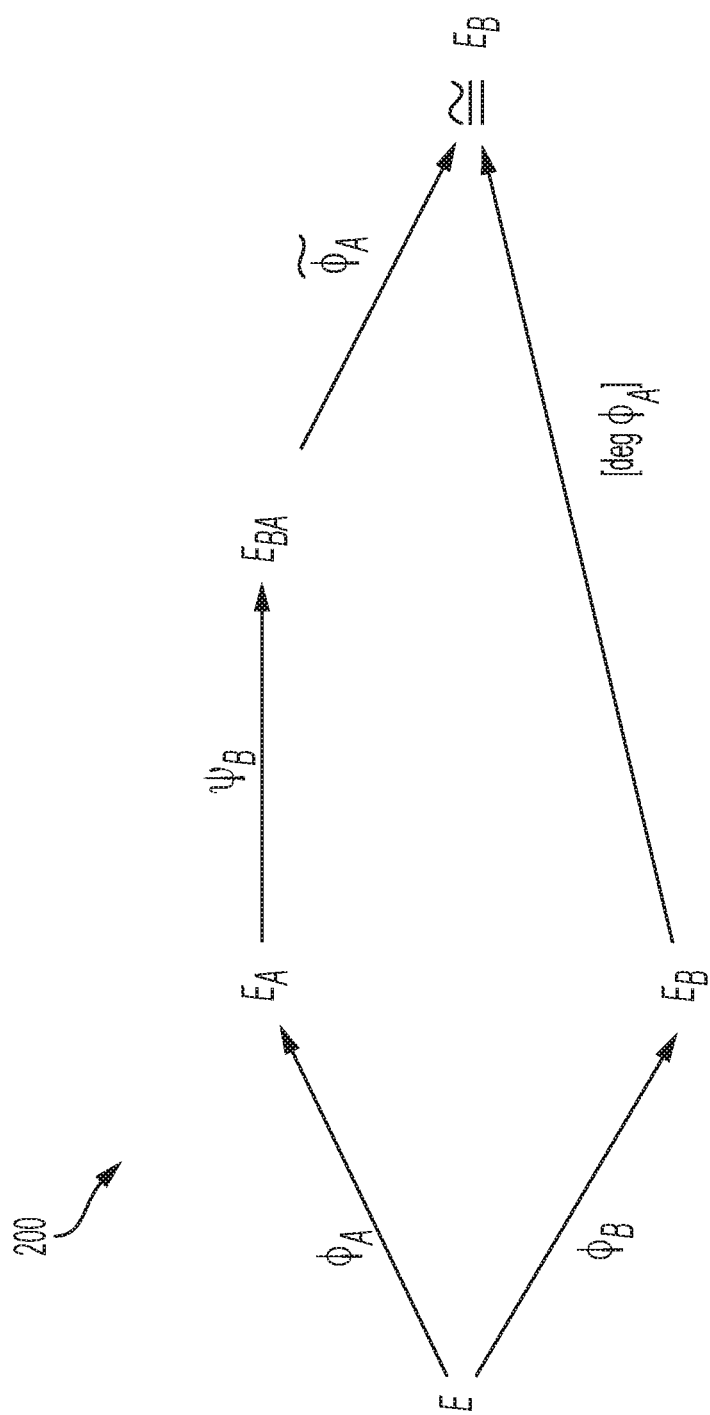
FIG. 2 is a diagram illustrating relationships among mathematical objects in some example supersingular isogeny-based cryptographic protocols.

FIG. 2 is a diagram illustrating relationships among mathematical objects 200 in some example supersingular isogeny-based cryptographic protocols. For instance, the mathematical objects 200 shown in FIG. 2 may be used in the example isogeny-based cryptographic protocols described with respect to FIGS. 3, 4, 5, 6 and 7. The mathematical objects 200 shown in FIG. 2 are described with respect to example entities that may execute isogeny-based cryptographic protocols. In particular, the following discussion of FIG. 2 considers the example of a broadcaster (e.g., "Bob" in FIGS. 3 and 5) and an authorized user (e.g., "Alice" in FIGS. 3 and 5); the protocols considered may be executed by other types of entities and may be useful in other contexts.

As shown in FIG. 2, a broadcaster can create an isogeny (a map) $\phi_B$ with domain E and a chosen kernel. The kernel may be treated as secret information that will not be revealed to anyone. Here, $E_B$ denotes the image of E under the map $\phi_B$. The isomorphism class of $E_B$ will be the shared secret key that will be shared with authorized users. An authorized user can create an isogeny $\phi_A$ with domain E and a chosen kernel. The kernel can be the authorized user's secret key, and the image $E_A$ of $\phi_A$ can be the authorized user's public key. The broadcaster can create an isogeny $\psi_B$ with domain $E_B$ which is similar to $\phi_B$, except that it is "shifted by $\phi_A$". The map $\psi_B$ may be defined so that the following equation holds $$\ker(\psi_B) = \phi_A(\ker(\phi_B)).$$

The broadcaster may send the image $E_{BA}$ of $\psi_B$ to the authorized user. The authorized user may then use her secret key to create an isogeny $\tilde{\phi}_A$ with domain $E_{BA}$ that essentially undoes her isogeny $\phi_A$, in the sense that the image $E_{\tilde{A}BA}$ of $\tilde{\phi}_A$ equals the image $E_B$ of $\phi_B$ (up to isomorphism). Accordingly, the authorized user ends up with the same shared key as the broadcaster, namely, the isomorphism class of $E_B$.

Next, suppose the broadcaster wants to create a new shared secret and distribute the updated key to only some of the users $A_1, \ldots, A_k$, where these users are those who have not been revoked. In some instances, this can be done without any additional information from the users. For example, the broadcaster can create an isogeny $\phi_{B'}$, whose image $E_{B'}$ gives the new shared secret. Analogous to the map $\psi_{B_i}$ shown in FIG. 2, the broadcaster can then compute an updated isogeny $\psi_{B_i'}$ with domain $E_{A_i}$ and kernel given by:

$$\ker(\psi_{B_i'}) = \phi_{A_i}(\ker(\phi_{B'})),$$

where $E_{A_i}$ is the public key of a user $A_L$. The broadcaster can publish the images $E_{B'A_1}, \ldots, E_{B'A_k}$ of $\psi_{B_1'}, \ldots, \psi_{B_k'}$, and the user whose secret key is the kernel of $E_{A_i}$ can use the same technique described above to calculate the updated shared secret $E_{B'}$. This way the broadcaster can distribute an updated key to a set of non-revoked users, without requiring additional information from the users.

Figure 3:
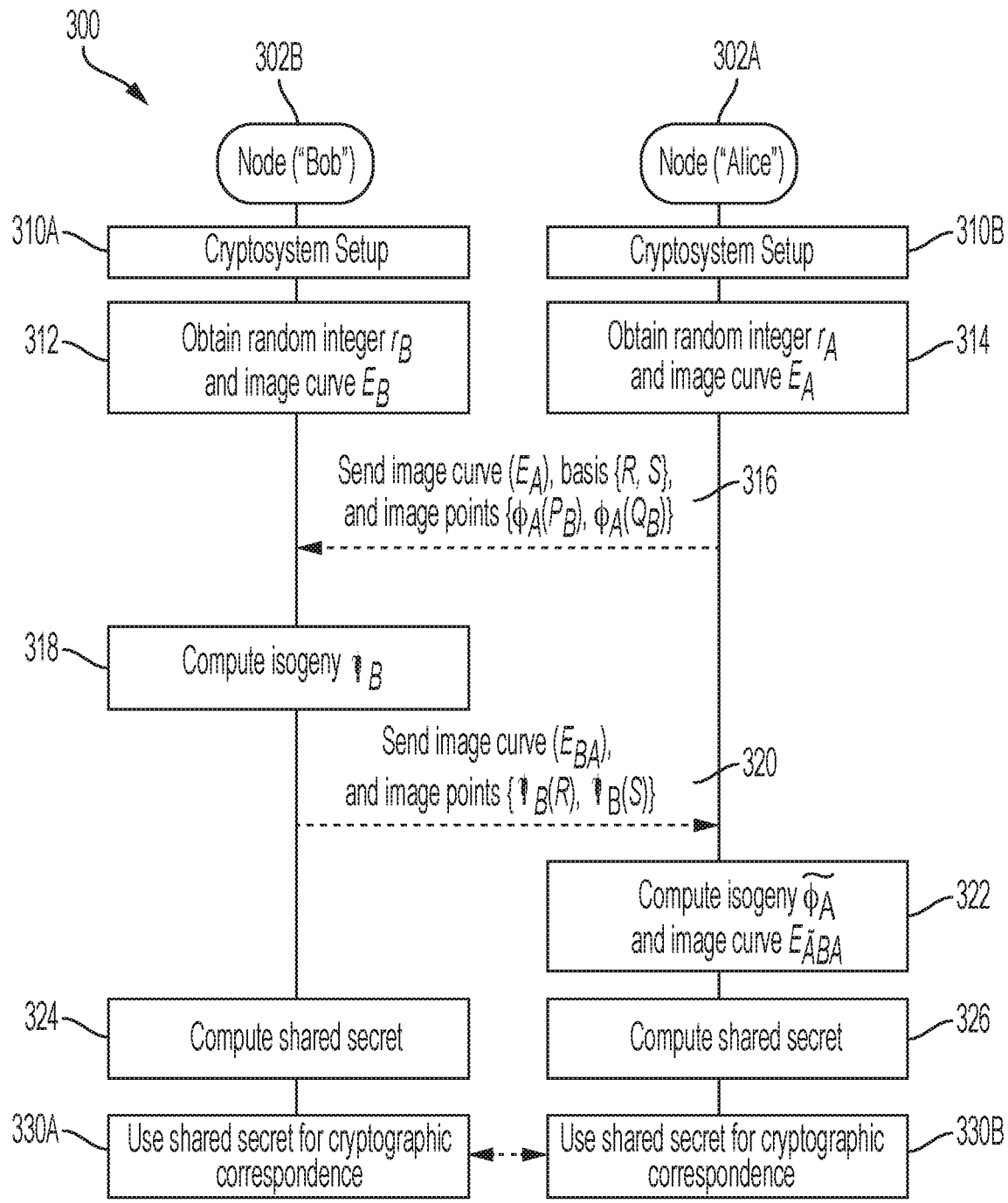
FIG. 3 is a flow diagram showing an example key establishment protocol in a supersingular isogeny-based cryptography system.

FIG. 3 is a flow diagram showing an example key establishment protocol process 300 in a supersingular isogeny-based cryptography system. The example cryptographic process 300 can be performed, for example, by computer systems that can exchange information over a communication channel. For instance, operations in the cryptographic process 300 may be performed by the nodes 102, 104 in the example communication system 100 shown in FIG. 1 or in another type of system. The example process 300 may include additional or different operations, including operations performed by additional or different entities, and the operations may be performed in the order shown or in another order.

In some cases, one or more of the operations shown in FIG. 3 are implemented as processes that include multiple operations, sub-processes or other types of routines. In some cases, operations can be combined, performed in parallel, iterated or otherwise repeated or performed in another manner.

The example process 300 shown in FIG. 3 includes operations performed by nodes 302A, 302B. In the example shown, the nodes 302A, 302B represent two distinct entities in a supersingular isogeny-based cryptosystem. The two distinct entities are referred to as "Alice" and "Bob" in FIG. 3. In some examples, "Bob" represents a broadcaster (e.g., a content provider or another type of broadcaster entity), and "Alice" represents a user (e.g., a content subscriber or another type of authorized entity). In the example shown, the nodes 302A, 302B exchange public data, and each node uses the public data provided by the other node to execute the process 300. The nodes 302A, 302B may communicate with each other, for example, directly or indirectly, in each stage of the process 300.

In the example shown in FIG. 3, each entity may correspond to a computing device, a computer system, an IP address or other network address, or another type of computer-readable identifier or instance of a computer resource. Accordingly, the computations and other operations of each entity may be performed by one or more processors or other elements of the respective node 302A, 302B. Similarly, information sent to or received by an entity may be sent to or received by an element (e.g., one or more processors, memories, or interfaces) of the respective node 302A, 302B.

As shown in FIG. 3, the nodes 302A, 302B communicate with each other to execute certain operations in the process 300. In the example shown in FIG. 3, either of the nodes may send information directly to the other node, or a node may initiate transmission indirectly, for example, through a communication device or otherwise. Moreover, information may be sent in multiple transmissions or a single transmission over one or more communication networks or other channels. All or part of the information can be transmitted over a public or private channel, and may in some instances be observed by a quantum-enabled adversary or another type of adversary.

In various points in the process 300 shown in FIG. 3, an entity needs to compute the image curve of an isogeny of a given kernel, or the entity needs to evaluate the isogeny with a given kernel at a particular point. These operations can be performed using any suitable technique. For example, when considering an isogeny whose kernel is generated by a single point of prime power order, there are methods that rely on Velu's formulas for computing the image curve of the isogeny and for point evaluation. An isogeny can also be computed via analogous formulas for curves in Montgomery form or twisted Edwards form.

At 310A and 310B, the nodes 302A, 302B perform one or more cryptosystem setup operations. A supersingular isogeny-based cryptosystem can be described in terms of a supersingular elliptic curve E and related cryptographic variables. Let p be a prime of the form $1_A^{e_A} 1_B^{e_B} f \pm 1$, where $1_A$ and $1_B$ are distinct primes. Choose a supersingular elliptic curve E whose coefficients are in $F_{p^2}$, where $F_{p^2}$ denotes a finite field of characteristic p with $p^2$ elements. Let $\{P_A, Q_A\}$ be a basis of the $1_A$-torsion points of E, and $\{P_B, Q_B\}$ be a basis of the $1_B$-torsion points of E. All of these values $(1_A, 1_B, p, E, P_A, Q_A, P_B, Q_B)$ can be designated as public parameters. Accordingly, the cryptosystem setup performed at 310A, 310B may include obtaining one or more of the public parameters of the cryptosystem as well as other setup operations.

At 312, the node 302B obtains a random integer $r_B$ and an image curve $E_B$. To obtain the random integer $r_B$, Bob may choose a random seed $r_B$ where $0 \leq r_B \leq 1_B^{e_B}$. To obtain the image curve $E_B$, Bob may construct an isogeny $\phi_B: E \rightarrow E_B$ having $\langle P_B + r_B Q_B \rangle$ as its kernel. At this point, Bob may compute the shared secret from the image curve $E_B$. In the example shown in FIG. 3, the j-invariant of the image curve $E_B$ will be the shared secret, and Bob wishes to transport this shared secret key to the other party (Alice).

At 314, the node 302A obtains a random integer $r_A$ and an image curve $E_A$. To obtain the random integer $r_A$, Alice may choose a random seed $r_A$ where $0 < r_A < 1_A^{e_A}$. To obtain the image curve $E_A$, Alice may construct the isogeny $\phi_A: E \rightarrow E_A$ having $\langle P_A + r_A Q_A \rangle$ as its kernel. Alice may then compute the image points $\phi_A(P_B)$, $\phi_A(Q_B)$, $\phi_A(Q_A)$. Alice may then compute a basis $\{R, S\}$ of the $1_A$-torsion points of $E_A$, and find secret integers c and d such that $\phi_A(Q_A) = cR + dS$.

At 316, Alice sends Bob several of the cryptographic objects that Alice has computed ($E_A$, R, S, $\phi_A(P_B)$ and $\phi_A(Q_B)$), while keeping the secret integers (c and d) secret. As shown in FIG. 3, the node 302A sends the image curve ($E_A$), the basis $\{R, S\}$, and the image points $\{\phi_A(B), \phi_A(Q_B)\}$ to the node 302B. In some cases, Alice does not need to send the basis $\{R, S\}$ to Bob. For example, Alice and Bob may each compute the basis $\{R, S\}$ in a deterministic manner (e.g., based on a protocol, public parameters, etc.).

At 318, the node 302B computes an isogeny $\psi_B$ and image points based on the cryptographic objects received from the node 302A. To compute the isogeny, Bob may construct the isogeny $\psi_B: E_A \rightarrow E_{BA}$ having $\langle \phi_A(P_B) + r_B \phi_A(Q_B) \rangle$ as its kernel. Bob may then compute the image points $\psi_B(R)$ and P(S), which are an image of the basis $\{R, S\}$ under the isogeny $\psi_B$.

At 320, Bob sends Alice several of the cryptographic objects that Bob has computed ($E_{BA}$, $\psi_B(R)$ and $\psi_B(S)$) As shown in FIG. 3, the node 302B sends the image curve ($E_{BA}$) and the image points $\{\psi_B(R), \psi_B(S)\}$ to the node 302A.

At 322, the node 302A computes an isogeny $\tilde{\phi}_A$ and an image curve $E_{\tilde{A}BA}$ based on the cryptographic objects received from the node 302B. To compute the isogeny A and the image curve $E_{\tilde{A}BA}$, Alice may construct the isogeny $\tilde{\phi}_A$: $E_{BA} \rightarrow E_{\tilde{A}BA}$ having $\langle C\psi_B(R) + d\psi_B(S) \rangle$ as its kernel.

At 324, Bob computes the shared secret from the image curve $E_B$. And at 326, Alice computes the shared secret from the image curve $E_{\tilde{A}BA}$. Because the image curve $E_{\tilde{A}BA}$ (computed by Alice at 322) is isomorphic to the image curve $E_B$ (obtained by Bob at 312) the j-invariant of the image curve $E_{\tilde{A}BA}$ is equal to the j-invariant of the image curve $E_B$ and can be used as the shared secret key between Alice and Bob.

At 330A and 330B, the nodes 302A and 302B use the shared secret for cryptographic correspondence. For example, the shared secret may be used in an encryption protocol, a digital signature protocol, etc.

In some cases, the cryptographic correspondence is executed between the nodes 302A, 302B using a symmetric key that is derived from the shared secret. For example, the symmetric key may be derived by applying a key derivation function to the j-invariant of the image curve $E_B$ (which is equal to the j-invariant of the image curve $E_{\tilde{A}BA}$). Accordingly, both nodes 302A and 302B may derive the same symmetric key from the shared secret. Using an encryption scheme, the node 302B can generate an encrypted message (e.g., encrypted content from Bob, a content provider) using the symmetric key, and the node 302A can decrypt the message using the symmetric key (e.g., to render the content for Alice, an authorized user).

The following discussion provides example algorithms that may be used, in some scenarios, to implement one or more operations in the process 300 shown in FIG. 3. Other algorithms may be used to implement operations in the process 300 in some cases.

In an example algorithm, at 312 and 324 in FIG. 3, Bob completes the following steps to compute the shared secret:
1. Chooses a random seed $r_B$, where $0 \le r_B \le l_B^{e_B}$.
2. Creates $K_B \times \langle P_B + r_B Q_B \rangle$.
3. Finds an isogeny $\phi_B: E \to E_B$, where $E_B = E/K_B$.
4. Calculates the j-invariant of $E_B$, to get the shared secret.

In an example algorithm, at 314 and 316 in FIG. 3, Alice completes the following steps:
1. Chooses a random seed $r_A$, where $0 < r_A < l_A^{e_A}$.
2. Calculates $K_A \langle P_A + r_A Q_A \rangle$.
3. Finds an isogeny $\phi_A: E \to E_A$, where $E_A = E/K_A$
4. Calculates $\phi_A(P_B)$, $\phi_A(Q_B)$, $\phi_A(Q_A)$.
5. Calculates a basis $\{R, S\}$ of $E_A [1_A^{e_A}]$.
6. Calculates secret integers c and d such that $\phi_A(Q_A) = cR + dS$.
7. Sends Bob $E_A$, $\phi_A(P_B)$, $\phi_A(Q_B)$, R, S.

In this example algorithm, there are a number of suitable techniques for computing the basis $\{R, S\}$ and the secret integers $\{c, d\}$. As one example, Alice may generate a random basis $\{R, S\}$ for the torsion subgroup $E_A [1_A^{e_A}]$, then apply the variant of the Pohlig-Hellman algorithm that applies to solving the elliptic curve discrete logarithm problem to compute the values c and d. As another example, Alice may generate a random point R with order $1_A^{e_A}$ which is independent from $\phi_A(Q_A)$, and a random integer $0 < d < 1_A^{e_A}$; then let S be a linear combination of R and $\phi_A(Q_A)$ (e.g., let $S = \phi_A(Q_A) - dR$, so that c=1). Other techniques may be used to obtain the basis $\{R, S\}$ and the secret integers $\{c, d\}$ in the example algorithm above. In some cases, Alice does not send the basis $\{R, S\}$ to Bob. For example, Alice and Bob may each compute the basis $\{R, S\}$ in a deterministic manner (e.g., based on a protocol, public parameters, etc.).

In an example algorithm, at 318 and 320 in FIG. 3, Bob completes the following steps:
1. Calculates $K_{BA} \langle \phi_A(P_B) + r_B \phi_A(Q_B) \rangle$.
2. Finds an isogeny $\phi_B: E_A \to E_{BA}$, where $E_{BA} = E_A/K_{BA}$.
3. Calculates $\psi_B(R)$, $\psi_B(S)$.
4. Sends Alice $E_{BA}$, $\psi_B(R)$, $\psi_B(S)$.

In an example algorithm, at 322 and 326 in FIG. 3, Alice completes the following steps to derive the shared secret:
1. Calculates $K_{\tilde{A}BA} = \langle c\psi_B(R) + d\psi_B(S) \rangle$.
2. Finds an isogeny $\tilde{\phi}_A: E_{BA} \to E_{\tilde{A}BA}$, where $E_{\tilde{A}BA} = E_{BA}/K_{\tilde{A}BA}$
3. Calculates the j-invariant of $E_{\tilde{A}BA}$, to get the shared secret.

In an example algorithm, at 330A and 330B in FIG. 3, Alice and Bob complete the following steps:
1. Bob encrypts data with a symmetric key that can be retrieved from the shared secret via a key derivation function.
2. Alice retrieves the symmetric key from a key derivation function.
3. Alice decrypts the data using the symmetric key.

Moreover, Bob can execute a similar process (e.g., using the same algorithms) with each authorized user, and Bob can then encrypt all his information based on the shared secret (e.g., using the same symmetric key), knowing that only authorized users have access to this shared secret (and by extension, to this symmetric key). For example, each authorized user may complete operations 314 and 316, each sending Bob a set of unique cryptographic objects (based on a unique random integer); and Bob may complete operations 318 and 320 with each authorized user, sending each authorized user the set of unique cryptographic objects that Bob derived from that authorized user's own set of unique cryptographic objects. All authorized users may then complete operations 326 and 330B to derive the same shared secret and the same symmetric key that Bob and other authorized users obtain. In this manner, Bob exchanges unique cryptographic objects with each authorized user, but all authorized users are able to derive the same shared secret and symmetric key.

Figure 4:
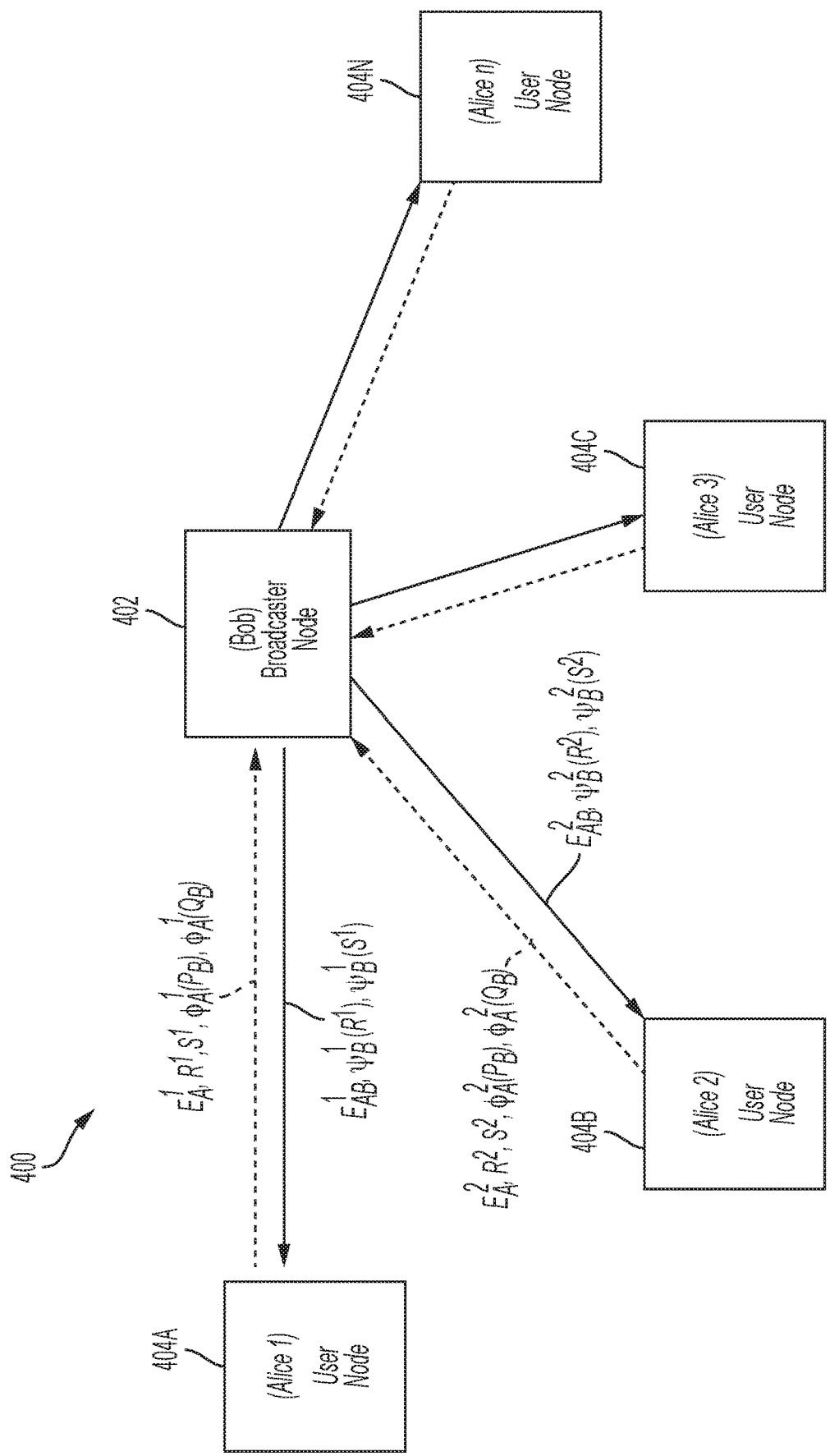
FIG. 4 is a block diagram of a communication system showing entities using an example key establishment protocol in a supersingular isogeny-based cryptography system.

FIG. 4 is a block diagram of a communication system 400 showing entities using an example key establishment protocol in a supersingular isogeny-based cryptography system. The example communication system 400 shown in FIG. 4 includes a broadcaster node 402 and several user nodes (referred to as "user nodes 404"). The broadcaster node 402 and each of the user nodes may be implemented, for example, as the nodes 102, 104 shown in FIG. 1.

The broadcaster node 402 and the user nodes 404 use a supersingular isogeny-based cryptosystem to communicate with each other (e.g., over one or more public or private channels such as the channel 106 in FIG. 1). The broadcaster node 402 and the user nodes 404 represent distinct entities in the cryptosystem. The broadcaster node 402 represents a broadcaster, referred to as "Bob." The user nodes 404 represent distinct authorized users who receive broadcast content from the broadcast. In the example shown in FIG. 4, there are four authorized user entities—the user node 404A represents an authorized user referred to as "Alice 1," the user node 404B represents another authorized user referred to as "Alice 2," the user node 404C represents another authorized user referred to as "Alice 3," and the user node 404N represents another authorized user referred to as "Alice N." The communication system 400 may generally include any number of authorized users (e.g., tens, hundreds, thousands, millions, etc.).

The broadcaster node 402 may execute a key establishment protocol with each of the user nodes 404, such that the broadcaster node 402 and each of the user nodes 404 obtains the same shared secret. In the example shown in FIG. 4, the broadcaster node 402 executes the example process 300 (shown in FIG. 3) with each individual user node 404, in which the broadcaster node 402 performs the operations of node 302B in FIG. 3, and each user node 404 performs the operations of node 302A in FIG. 3.

As shown in FIG. 4, each user node 404 sends the broadcast node 402 a set of unique cryptographic objects based on its random integer. For example, Alice 1 sends Bob a first set of cryptographic objects that includes the image curve $(E_A^1)$, the basis $\{R^1, S^1\}$, and the image points $\{\phi_A^1(P_B), \phi_A^1(Q_B)\}$, whereas Alice 2 sends Bob a second, distinct set of cryptographic objects that includes the image curve $(E_A^2)$, the basis $\{R^2, S^2\}$, and the image points $\{\phi_A^2(P_B), \phi_A^2(Q_B)\}$. Here, the sets of cryptographic objects are different because the first set of cryptographic objects are computed by Alice 1 based on a first random integer $r_A^1$, whereas the second set of cryptographic objects are computed by Alice 2 based on a second, different random integer $r_A^2$. Similarly, Alice 3 and Alice N each send unique sets of cryptographic objects to Bob. Each of the user nodes 404 retains its own unique set of secret integers that were used to compute the cryptographic objects sent to Bob. For example, Alice 1 may retain secret integers $\{c^1, d^1\}$, Alice 2 may retain secret integers $\{c^2, d^2\}$, etc.

As shown in FIG. 4, the broadcast node 402 sends each user node 404 a corresponding set of unique cryptographic objects based on the data received that user node 404. For example, Bob sends Alice 1 a first set of cryptographic objects that includes the image curve $(E_{AB}^1)$ and the image points $\{\psi_B^1(R^1), \psi_B^1(S^1)\}$, whereas Bob sends Alice 2 a second, distinct set of cryptographic objects that includes the image curve $(E_{AB}^2)$ and the image points $\{\psi_B^2(R^2), \psi_B^2$ ($S^2$)}. Here again, the sets of cryptographic objects are different because the first set of cryptographic objects are computed from the information from Alice 1, whereas the second set of cryptographic objects are computed from the information from Alice 2. Similarly, Alice 3 and Alice N each receive unique sets of cryptographic objects from Bob.

In the example shown in FIG. 4, the broadcaster node 402 can compute a shared secret once (e.g., as described with respect to operations 312 and 324 in FIG. 3), and each of the user nodes 404 can compute the same shared secret based on the information they receive from Bob (e.g., as described with respect to operations 322 and 326 in FIG. 3). For example, Alice 1 can compute the shared secret based on the image curve ($E_{AB}^1$) and the image points {$\psi_B^1(R^1)$, $\psi_B^1(S^1)$} from Bob and the secret integers {$c^1$, $d^1$} that Alice 1 retained; and Alice 2 can compute the same shared secret based on the image curve ($E_{AB}^2$) and the image points {$\psi_B^2(R^2)$, $\psi_B^2(S^2)$} from Bob and the secret integers {$c^2$, $d^2$} that Alice 2 retained. Similarly, Alice 3 and Alice N each compute the same shared secret.

Figure 5:
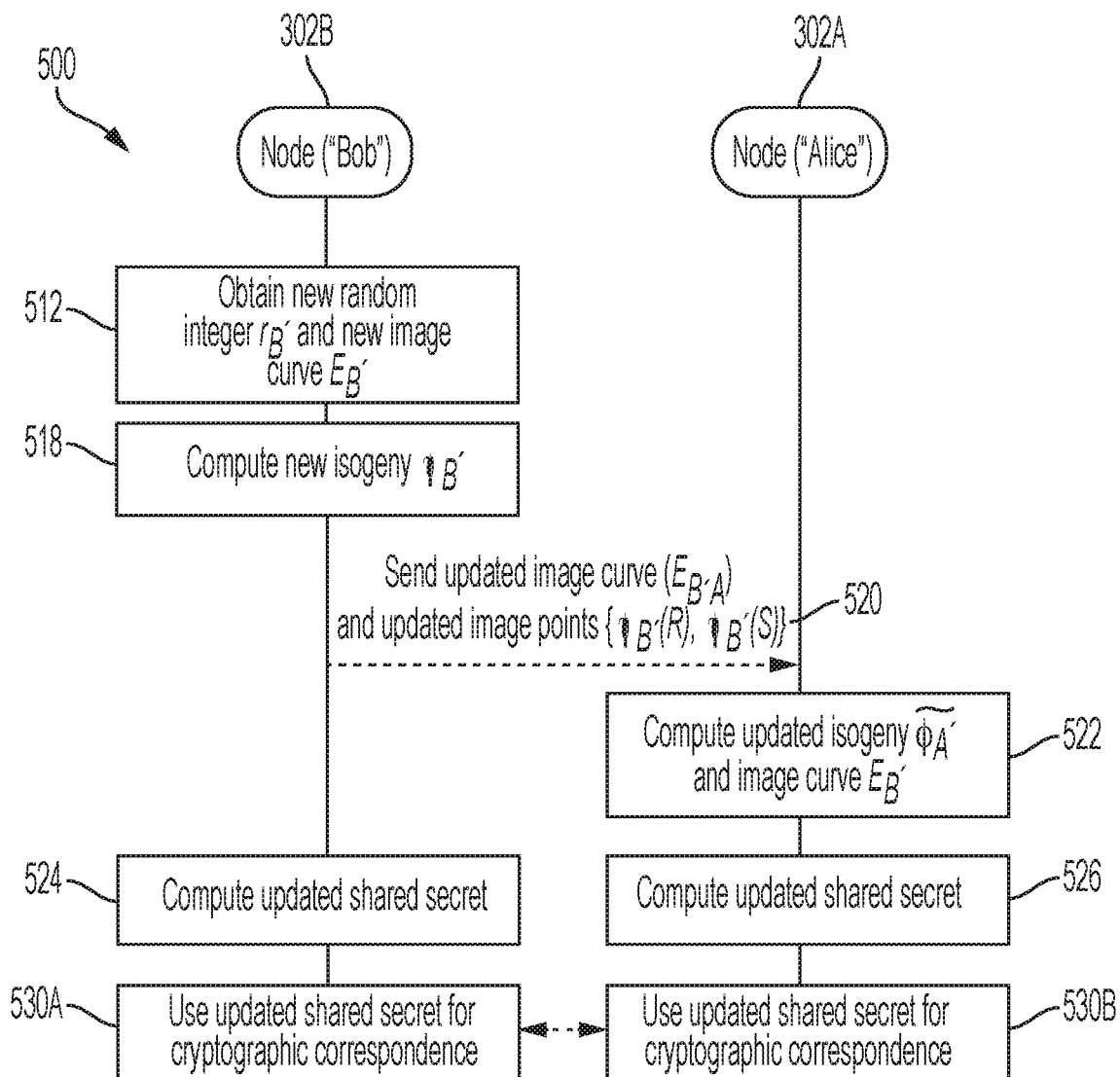
FIG. 5 is a flow diagram showing an example key update process in a supersingular isogeny-based cryptography system.

FIG. 5 is a flow diagram showing an example key update process 500 in a supersingular isogeny-based cryptography system. As shown in FIG. 5, the process 500 can be performed by the nodes 302A, 302B shown in FIG. 3. For example, Alice and Bob may execute the key update process 500 shown in FIG. 5 each time they want to refresh or update their shared secret after they have executed the initial key establishment process 300 shown in FIG. 3. Accordingly, the process 500 shown in FIG. 5, may be considered a continuation of the process 300 shown in FIG. 3. In the context of FIG. 4, the example process 500 may be executed between the broadcaster node 402 and one, some or all of the user nodes 404. Additionally or alternatively, the key update process 500 can be executed between Alice and another entity (e.g., another broadcaster) who knows Alice's public key (e.g., an entity other than Bob who has obtained the set of cryptographic objects that Alice sent to Bob at 316 in FIG. 3).

At 512, the node 302B obtains a new random integer $r_B$, and a new image curve $E_{B'}$. For example, Bob may obtain the new random integer and the new image curve as described with respect to 312 in FIG. 3. In the example shown in FIG. 3, the j-invariant of the new image curve $E_{B'}$ will be the new shared secret, and Bob wishes to transport this new shared secret key to the other party (Alice).

At 518, the node 302B computes a new isogeny $\psi_{B'}$, and new image points {$\psi_{B'}(R)$, $\psi_{B'}(S)$} based on the cryptographic objects previously received from the node 302A (the cryptographic objects sent to Bob at 316 in FIG. 3). For example, Bob may compute the new isogeny and the new image points as described with respect to 318 in FIG. 3.

At 520, Bob sends Alice several of the cryptographic objects that Bob has computed at 518. As shown in FIG. 5, the node 302B sends a new image curve ($E_{B'A}$) and the new image points {$\psi_{B'}(R)$, $\psi_{B'}(S)$} to the node 302A.

At 522, the node 302A computes an updated isogeny $\tilde{\phi}_A$, and a new image curve $E_{\tilde{A}B'A}$ based on the cryptographic objects received from the node 302B at 520. For example, Alice may compute the updated isogeny and the new image curve as described with respect to 322 in FIG. 3.

At 524, Bob computes the new shared secret from the new image curve $E_{B'}$. And at 526, Alice computes the new shared secret from the new image curve $E_{\tilde{A}B'A}$. Because the new image curve $E_{\tilde{A}B'A}$ (computed by Alice at 522) is isomorphic to the new image curve $E_{B'}$ (obtained by Bob at 512) the j-invariant of $E_{\tilde{A}B'A}$ is equal to the j-invariant of $E_{B'}$, and can be used as the shared secret key between Alice and Bob.

At 530A and 530B, the nodes 302A and 302B use the updated shared secret for cryptographic correspondence. For example, the updated shared secret may be used as described with respect to 330A, 330B in FIG. 3. For instance, both nodes 302A and 302B may derive an updated symmetric key from the updated shared secret, and use the updated symmetric key for encrypted communication.

Accordingly, the example process 500 includes only a single transfer of information between the nodes 302A, 302B. In particular, Bob initiates the key update process 500 by sending the new set of cryptographic objects to Alice at 520, without having received any new information or an update request from Alice. As such, Bob may use the process 500 to update the shared secret independent of any input from Alice. Moreover, Alice does not need to send Bob a new set of cryptographic objects or any other information to Bob to effectuate the key update.

In some instances, the example techniques shown and described with respect to FIGS. 3, 4 and 5 can be implemented with valid transcripts and other features. Suppose Alice is an authorized user and learns Bob's shared secret j($E_B$) through legitimate means, and a non-authorized user Eve then obtains the shared secret from Alice. In the examples where Bob is a content broadcaster, the authorized user Alice may have paid for a channel, and the non-authorized user Eve wants to watch the channel for free. To address this situation, the key establishment protocol (e.g., process 300 in FIG. 3) may be executed such that every authorized user gets a "valid transcript." The transcript of the protocol may contain the data sent between the two parties (e.g., $E_A$, $\phi_A(P_B)$, $\phi_A(Q_B)$, R, S, and $E_{BA}$, $\psi_B(R)$, $\psi_B(S)$ in the example shown in FIG. 3). Transcripts other than Alice's transcript typically cannot be forged because at 320 in FIG. 3, Alice receives $E_{BA}$, $\psi_B(R)$, $\psi_B(S)$, which were constructed using the isogeny $\psi_B$, and $\psi_B$ could only be found using Bob's random seed $r_B$.

Considering a scenario where Alice sends Eve her transcript (which is a valid transcript), this does not count as a forgery since it was initially obtained through a valid interaction with Bob. Even after completing the example process 300 with Bob, Alice does not have Bob's seed $r_B$. This means Alice cannot provide a different valid transcript for Eve. In other words, Alice cannot complete operations 318 and 320 for Eve's secret key. Suppose, for example, the broadcaster suspected Eve of not being an authorized user. If Eve was an honest user then she can provide the transcript to Bob, and this may demonstrate to Bob that he had provided her with the shared secret. This is because Bob knows he is the only one who has his seed $r_B$. Generating the valid transcript requires Bob's random seed $r_B$. The valid transcript is not based on a public key of Bob, but on information that is needed to create the very shared secret itself. Additionally, even if Alice wants to dishonestly give another party Eve the encryption key, Alice would need to give an updated shared secret to Eve each time the broadcaster updates the key, which further discourages dishonest users.

The techniques shown and described below with respect to FIGS. 6 and 7 can be used to provide additional security, for example, to reduce exposure to certain types of known attacks. A known issue with some quantum-safe protocols is that there are powerful active attacks against long-term "static" keys. In isogeny-based cryptography, in particular, there is an active attack described by Galbraith et al. (see S. D. Galbraith, et al., "On the security of supersingular isogeny cryptosystems." *In International Conference on the Theory and Application of Cryptology and Information*

*Security*, pp. 63-91, Springer, Berlin, Heidelberg, December 2016.) against a party with a static key. In this attack a dishonest party sends an altered public key that allows the dishonest party to discover a single bit of information about the other user's secret key. By repeating this attack a few hundred times the dishonest party is able to construct the other party's entire secret key. Like multiple other isogeny-based cryptographic protocols, in some instances the process 300 shown in FIG. 3 is not necessarily secure against the active attack described by Galbraith et al. As only an authorized user can complete this attack, they already have access to the shared secret and symmetric encryption key. A party cannot use this attack to dishonestly find the encryption key. However, if they discover Bob's secret key $r_B$, then they could forge transcripts for non-authorized users. As a countermeasure, to avoid giving up Bob's secret key, Bob could perform a Fujisaki-Okamoto type verification to check that Alice's public key is untampered, as described with respect to FIGS. 6 and 7.

This Fujisaki-Okamoto type verification does not need to be completed by the broadcaster; it could be completed by any party that is trusted by the broadcaster. For example, consider the situation where there is a single cable provider, and many different cable channels. Alice could pay for any subset of those cable channels. The channel providers serve as the broadcasters, and the overall cable provider could serve as the trusted third party who verifies and signs Alice's public key (e.g., when she creates an account). Then Alice could send this verified public key to any individual channel provider. If Alice pays for that particular channel, then that individual channel provider could then provide Alice their particular shared key.

Figure 6:
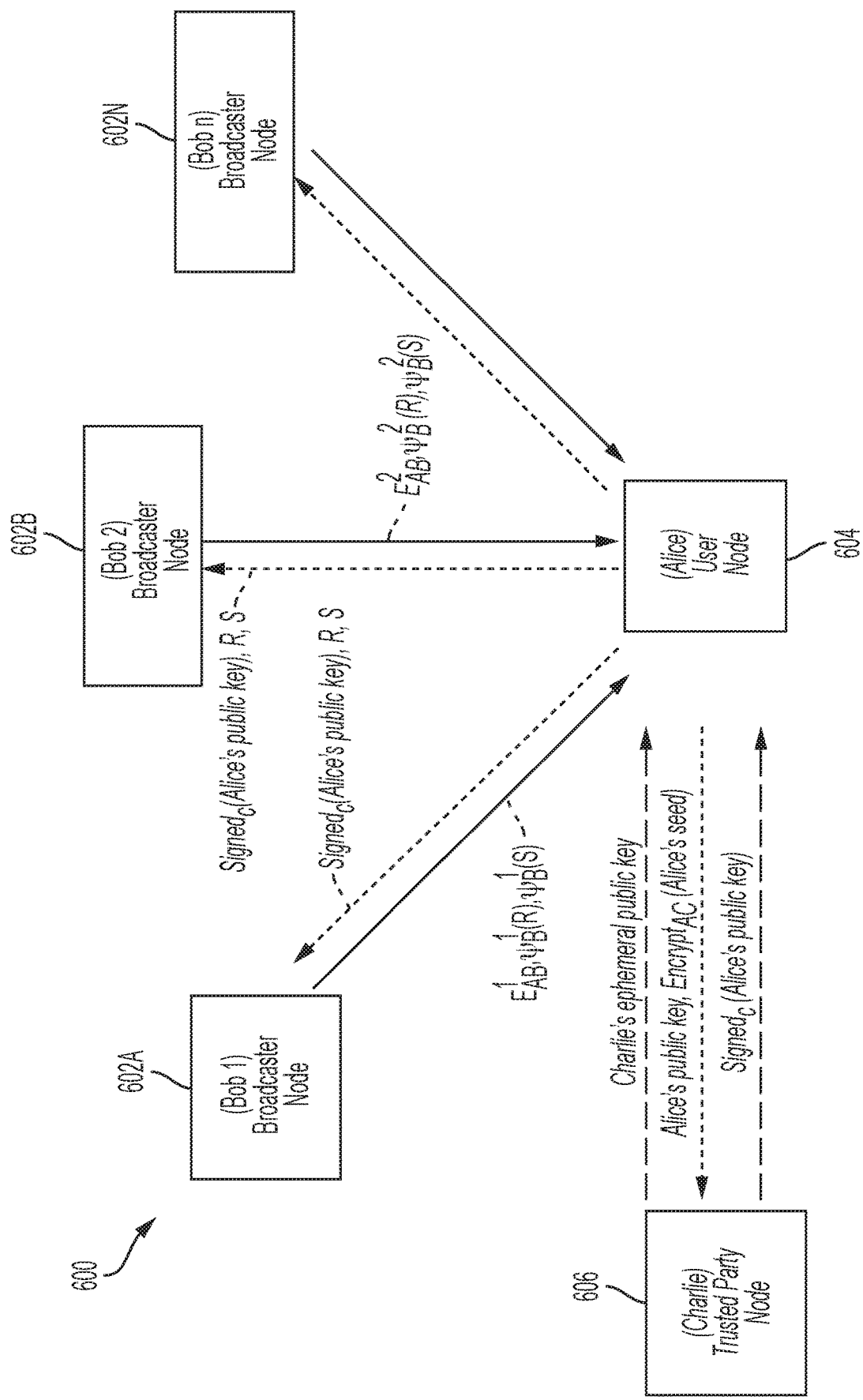
FIG. 6 is a block diagram of a communication system showing entities using an example key establishment protocol with third-party verification in a supersingular isogeny-based cryptography system.

FIG. 6 is a block diagram of a communication system 600 showing entities using an example key establishment protocol with third-party verification in a supersingular isogeny-based cryptography system. The example communication system 600 shown in FIG. 6 includes several broadcaster nodes (referred to as "broadcaster nodes 602"), a user node 604 and a trusted party node 606. Each of the broadcaster nodes 602, the user node 604 and the trusted party node 606 may be implemented, for example, as the nodes 102, 104 shown in FIG. 1.

The user node 604 uses a supersingular isogeny-based cryptosystem to communicate with the broadcaster nodes 602 and the trusted party node 606 (e.g., over one or more public or private channels such as the channel 106 in FIG. 1). In the example shown in FIG. 6, the broadcaster nodes 602, the user node 604 and the trusted party node 606 represent distinct entities in the cryptosystem. The user node 604 represents an authorized user entity, referred to as "Alice." The broadcaster nodes 602 represent distinct broadcaster entities (e.g., channel providers) that broadcast content. In the example shown in FIG. 6, there are three broadcaster entities—the broadcaster node 602A represents a broadcaster entity referred to as "Bob 1," the broadcaster node 602B represents another broadcaster entity referred to as "Bob 2," and the broadcaster node 602N represents another broadcaster entity referred to as "Bob N." The communication system 600 may generally include any number of broadcasters (e.g., tens, hundreds, thousands, millions, etc.), which may correspond to channel providers for a cable system or other types of broadcast entities. The trusted party node 606 represents a third party entity (e.g., a cable company) that is trusted by both Alice and Bob, referred to as "Charlie."

In the example shown in FIG. 6, a Fujisaki-Okamoto type verification is used to check that Alice's public key is untampered. Alice and Charlie compute a temporary shared secret (e.g., using a Supersingular Isogeny Diffy Hellman protocol (SIDH) or another key establishment protocol), and Alice uses this shared secret to encrypt her secret seed value (e.g., to encrypt the random integer $r_A$ computed at 314 in FIG. 3). As shown in FIG. 6, Alice sends Charlie her public key (e.g., the image curve ($E_A$), the basis {R, S}, and the image points {$\phi_A(P_B)$, $\phi_A(Q_B)$} computed at 314 in FIG. 3) and her encrypted secret key (shown as "Encrypt$_{AC}$(Alice's seed)" in FIG. 6, representing an encryption function applied to Alice's secret seed value using the shared secret established between Alice and Charlie). In some cases, Alice does not need to send the basis {R, S} to Charlie. For example, Alice, Bob and Charlie may each compute the basis {R, S} in a deterministic manner (e.g., based on a protocol, public parameters, etc.).

In the example shown in FIG. 6, Charlie verifies Alice's public key has not been manipulated, and Charlie signs Alice's public key. Charlie's signature may be provided as a certificate from Charlie that Alice's public key is valid. Charlie's signature is shown as "Signed$_C$(Alice's public key)" in FIG. 6, representing a signature applied to Alice's public key using Charlie's private key. Alice then completes a key establishment protocol with each broadcaster entity, and the broadcaster entities verify Alice's public key based on the certificate provided by Charlie. For instance, as shown in FIG. 6, Alice sends the certificate to each broadcaster node in conjunction with the key establishment protocol.

Each of the broadcaster nodes 602 may execute a key establishment protocol with the user node 604, such that the user node 604 obtains a distinct shared secret from each broadcaster node. In the example shown in FIG. 6, the user node 604 executes the example process 300 (shown in FIG. 3) with each individual broadcaster node 604, in which each broadcaster node 602 performs the operations of node 302B in FIG. 3, and the user node 404 performs the operations of node 302A in FIG. 3.

In the example shown in FIG. 6, the user node 604 sends each broadcast node 602 the same set of cryptographic objects based on Alice's seed value. For example, Alice may send, to each broadcast node 602, the basis {R, S} and a certificate that includes Alice's public key (e.g., the image curve ($E_A$), and the image points {$\phi_A(P_B)$, $\phi_A(Q_B)$}) along with Charlie's signature on Alice's public key. Each of the broadcasters may use Charlie's signature to verify that Alice's public key is valid before sending Alice the information that enables her to derive their secret key.

As shown in FIG. 6, each broadcast node 602 sends the user node 604 a set of unique cryptographic objects based on that particular broadcaster node's shared secret. For example, Bob 1 sends Alice 1 a first set of cryptographic objects that includes the image curve ($E_{AB}^1$) and the image points {$\psi_B^1(R)$, $\psi_B^1(S)$}, whereas Bob 2 sends Alice a second, distinct set of cryptographic objects that includes the image curve ($E_{AB}^2$) and the image points {$\psi_B^2(R)$, $\psi_B^2(S)$}. Here, the sets of cryptographic objects are different because the first set of cryptographic objects are computed by Bob 1 based on a first random integer $r_B^1$, whereas the second set of cryptographic objects are computed by Bob 2 based on a second, different random integer $r_B^2$. Accordingly, the set of cryptographic objects from each broadcaster enables Alice to derive that broadcaster's distinct shared secret.

Figure 7:
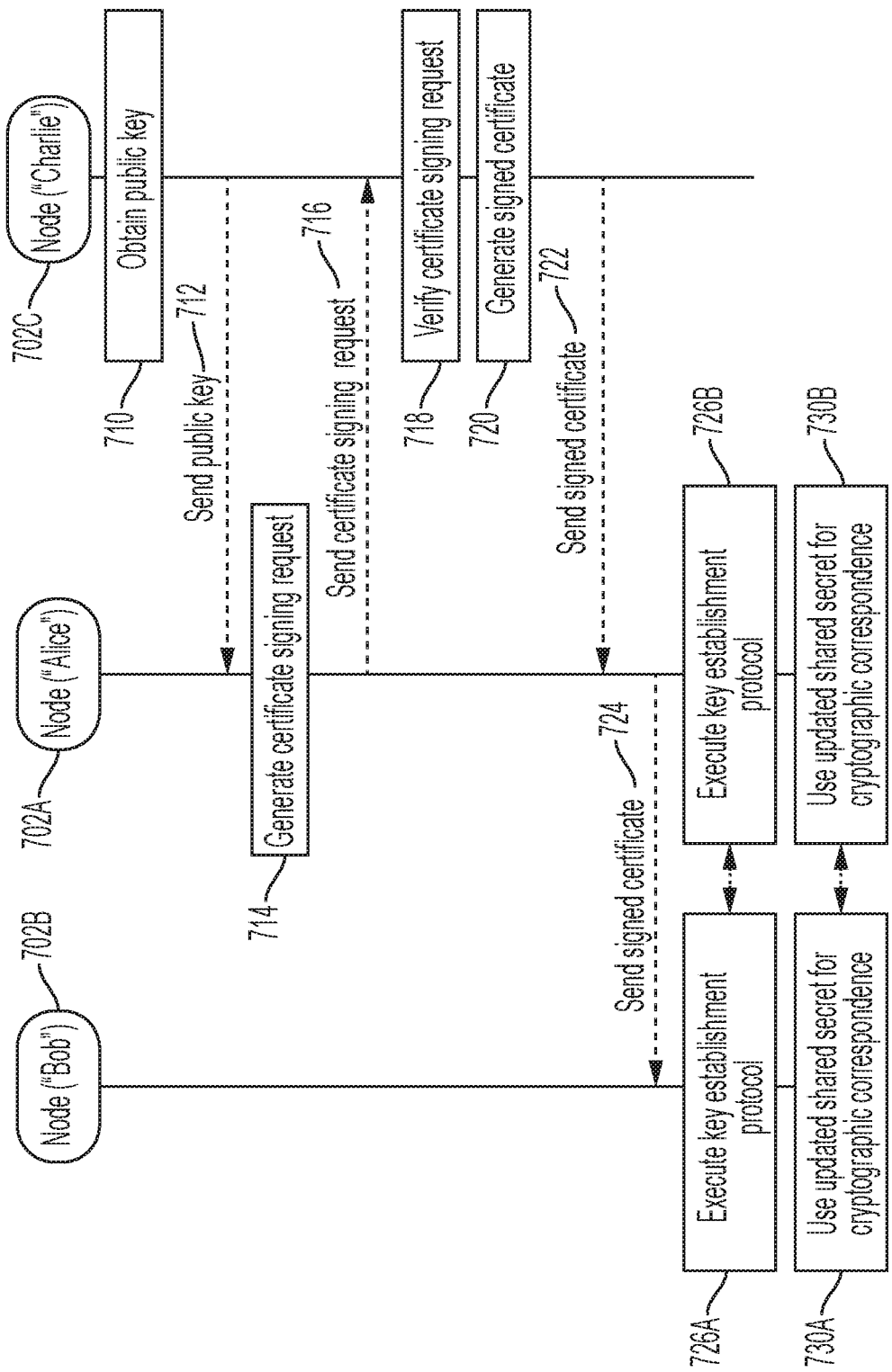
FIG. 7 is a flow diagram showing an example key establishment protocol with third-party verification in a supersingular isogeny-based cryptography system.

FIG. 7 is a flow diagram showing an example key establishment protocol with third-party verification in a supersingular isogeny-based cryptography system. The example cryptographic process 700 can be performed, for example, by computer systems that can exchange information over a communication channel. For instance, operations in the cryptographic process 700 may be performed by the nodes 602, 604, 606 in the example communication system 600 shown in FIG. 6 or in another type of system. The example process 700 may include additional or different operations, including operations performed by additional or different entities, and the operations may be performed in the order shown or in another order.

In some cases, one or more of the operations shown in FIG. 7 are implemented as processes that include multiple operations, sub-processes or other types of routines. In some cases, operations can be combined, performed in parallel, iterated or otherwise repeated or performed in another manner.

The example process 700 shown in FIG. 7 includes operations performed by nodes 702A, 702B, 702C. In the example shown, the nodes 702A, 702B, 702C represent three distinct entities in a supersingular isogeny-based cryptosystem. The three distinct entities are referred to as "Alice," "Bob," and "Charlie" in FIG. 7. In some examples, "Bob" represents a broadcaster (e.g., a content provider or another type of broadcaster entity), "Alice" represents an authorized user (e.g., a content subscriber or another type of authorized entity), and "Charlie" represents a trusted third party (e.g., cable service provider, an internet service provider, or another type of content service). In the example shown, the nodes 702A, 702B, 702C exchange public data, and each node uses the public data provided by the other nodes to execute part of the process 700. The nodes 702A, 702B, 702C may communicate with each other, for example, directly or indirectly, in each stage of the process 700.

In the example shown in FIG. 7, each entity may correspond to a computing device, a computer system, an IP address or other network address, or another type of computer-readable identifier or instance of a computer resource. Accordingly, the computations and other operations of each entity may be performed by one or more processors or other elements of the respective node 702A, 702B, 702C. Similarly, information sent to or received by an entity may be sent to or received by an element (e.g., one or more processors, memories, or interfaces) of the respective node 702A, 702B, 702C.

As shown in FIG. 7, the nodes 702A, 702B, 702C communicate with each other to execute certain operations in the process 700. In the example shown in FIG. 7, any of the nodes may send information directly to another node, or a node may initiate transmission indirectly, for example, through a communication device or otherwise. Moreover, information may be sent in multiple transmissions or a single transmission over one or more communication networks or other channels. All or part of the information can be transmitted over a public or private channel, and may in some instances be observed by a quantum-enabled adversary or another type of adversary.

At 710, node 702C obtains a public key, and at 712, node 702C sends the public key to node 702C. For example, Charlie may complete the following steps in a key generation algorithm:
1. Chooses a random seed $r_C$, where $0 \leq r_C \leq l_B^{e_B}$.
2. Calculates $K_C = \langle P_B + r_C Q_B \rangle$.
3. Finds an isogeny $\phi_C$: $E \to E_C$, where $E_C = E/K_C$.
4. Calculates $\phi_C(P_A)$, $\phi_C(Q_A)$.
5. Sends Alice $E_C$, $\phi_C(P_A)$, $\phi_C(Q_A)$.

In some cases, Charlie may obtain a public key in another manner, for example, using another type of algorithm.

At 714, node 702A generates a certificate signing request, and at 716, node 702A sends the certificate signing request to node 702C. For example, Alice may complete the following steps:
1. Chooses a random seed $r_A$, where $0 \leq r_A \leq l_A^{e_A}$.
2. Calculates $K_A = \langle P_A + r_A Q_A \rangle$.
3. Finds an isogeny $\phi_A$: $E \to E_A$, where $E_A = E/K_A$.
4. Calculates $\phi_A(P_B)$, $\phi_A(B)$, $\phi_A(Q_A)$.
5. Calculates $K_{AC} = \langle \phi_C(P_A) + r_A \phi_C(Q_A) \rangle$.
6. Finds an isogeny $\phi_{AC}$: $E_C \to E_{AC}$, where $E_{AC} = E_C/K_{AC}$.
7. Encrypts $r_A$ using the j-invariant of $E_{AC}$. We will let $t = \text{Enc}(r_A)$.
8. Sends Charlie, $E_A$, $\phi_A(P_B)$, $\phi_A(Q_B)$, t.

In some cases, Alice may generate the certificate signing request in another manner.

At 718, node 702C verifies the certificate signing request; at 720, node 702C generates a signed certificate; and at 722, node 702C sends the signed certificate to node 702A. For example, Charlie may verify the certificate signing request to confirm that Alice is performing honestly by completing the following steps:
1. Calculates $K_{CA} \langle \phi_A(P_B) + r_C \phi_A(Q_B) \rangle$.
2. Finds an isogeny $\psi_C$: $E_A \to E_{CA}$, where $E_{CA} = E_A/K_{CA}$
3. Decrypts t using the j-invariant of $E_{CA}$. We may call the decrypted text $r_A'$.
4. Calculates $K_A' = \langle P_A + r_A' Q_A \rangle$.
5. Finds an isogeny $\phi_A'$: $E \to E_A'$, where $E_A' = E/K_A'$.
6. Calculates $\phi_A'(P_B)$, $\phi_A'(Q_B)$.
7. Compares $E_A'$, $\phi_A'(P_B)$, $\phi_A'(Q_B)$ to Alice's public key $E_A$, $\phi_A(P_B)$, $\phi_A(Q_B)$.
8. Signs Alice's public key to generate a certificate for Alice's public key (if the verification of Alice's public key succeeded at step 7).
9. Sends the certificate to Alice.

If Charlie's verification of Alice's public key succeeds then the process 700 continues. In some implementations, Bob and Charlie are the same entity and certain operations can be combined accordingly.

At 726A and 726B, nodes 702A and 702B execute a key establishment protocol. For example, nodes 702A and 702B may execute the example key establishment protocol process 300 shown in FIG. 3, with node 702A performing the operations of node 302A, and node 702B performing the operations of node 302B.

In some examples, the key establishment protocol executed between Alice and Bob at 726A and 726B may proceed with Alice completing the following steps:
1. Calculates a basis $\{R, S\}$ of $E_A[l_A^{e_A}]$.
2. Calculates secret numbers c and d such that $\phi_A(Q_A) = cR + dS$.
3. Sends Bob $E_A$, $\phi_A(P_B)$, $\phi_A(B)$, $\phi_A(Q_A)$, R, S, where the string $E_A$, $\phi_A(P_B)$, $\phi_A(Q_B)$ has been signed by Charlie.

In some examples, the key establishment protocol executed between Alice and Bob at 726A and 726B may proceed with Bob completing the following steps to create the shared secret and to provide the shared secret to Alice:
1. Chooses a random seed $r_B$, where $0 \leq r_B \leq l_B^{e_B}$.
2. Calculates $K_B = \langle P_B + r_B Q_B \rangle$.
3. Finds an isogeny $\phi_B$: $E \to E_B$, where $E_B = E/K_B$.
4. Calculate the j-invariant of $E_B$, to get the shared secret.
5. Calculates $K_{BA} = \langle \phi_A(P_B) + r_B \phi_A(Q_B) \rangle$.
6. Finds an isogeny $\psi_B$: $E_A \to E_{BA}$, where $E_{BA} = E_A/K_{BA}$
7. Calculates $\psi_B(R)$, $\psi_B(S)$.
8. Sends Alice $E_{BA}$, $\psi_B(R)$, $\psi_B(S)$ In some examples, the key establishment protocol executed between Alice and Bob at 726A and 726B may proceed with Alice completing the following steps to derive the shared secret:

1. Calculates $K_{\tilde{A}BA} = \langle c\psi_B(R) + d\psi_B(S)\rangle$.
2. Finds an isogeny $\tilde{\phi}_A: E_{BA} \to E_{\tilde{A}BA}$, where $E_{\tilde{A}BA} = E_{BA}/K_{\tilde{A}BA}$.
3. Calculate the j-invariant of $E_{\tilde{A}BA}$, to get the shared secret.

At 730A and 730B, the nodes 702A and 702B use the shared secret for cryptographic correspondence. For example, the shared secret may be used in an encryption protocol, a digital signature protocol, etc.

In some cases, the cryptographic correspondence is executed between the nodes 702A, 702B as described with respect to operations 330A and 330B in FIG. 3. For example, Alice and Bob may use a symmetric key that is derived from the shared secret. In some examples, Bob encrypts the data with the symmetric key derived from the shared secret, and Alice decrypts the data with the symmetric key derived from the shared secret. Bob may perform a similar process with each authorized user receiving Bob's broadcast.

Figure 8:
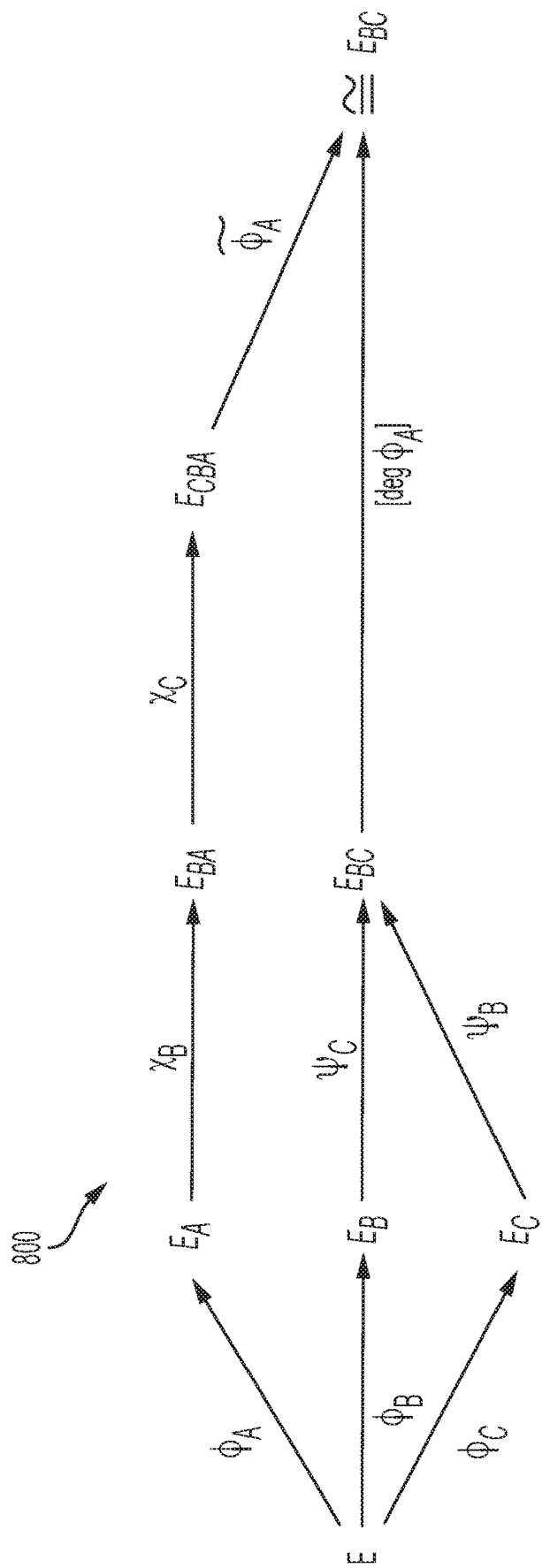
FIG. 8 is a diagram illustrating relationships among mathematical objects in some example supersingular isogeny-based cryptographic protocols.

FIG. 8 is a diagram illustrating relationships among mathematical objects 800 in some example supersingular isogeny-based cryptographic protocols. The mathematical objects 800 shown in FIG. 8 are described with respect to example entities that may execute isogeny-based cryptographic protocols. In particular, the following discussion of FIG. 8 considers the example of two broadcaster entities (referred to as "Bob" and "Charlie") and an authorized user (referred to as "Alice"); the protocols considered may be executed by other types of entities and may be useful in other contexts.

The mathematical objects 800 shown in FIG. 8 may be used, for example, in a scenario where two distinct parties (e.g., Bob and Charlie) wish to contribute toward a shared broadcasting key, which is then provided to many authorized users (e.g., Alice and other authorized users). By using a prime of the form $1_A^{e_A} 1_B^{e_B} 1_C^{e_C} f \pm 1$, the two broadcaster entities can create the shared broadcasting key together and then send it to multiple users. The data (e.g., the content broadcast by Bob or Charlie, or both) could then be encrypted using the shared broadcasting key.

As shown in FIG. 8, a supersingular elliptic curve E whose coefficients are in $F_{p^2}$ is chosen. Let $\{P_A, Q_A\}$ be a basis of the $1_A$-torsion points of E, $\{P_B, Q_B\}$ be a basis of the $1_B$-torsion points of E, and $\{P_C, Q_C\}$ be a basis of the $1_C$-torsion points of E. All of these values $1_A, 1_B, 1_C, p, E, P_A, Q_A, P_B, Q_B, P_C, Q_C$) can be used as public parameters. In the scenario where Bob and Charlie wish to create a shared broadcasting key together and transmit it to Alice, Bob and Charlie first create the shared broadcasting key. In the example shown in FIG. 8, Bob and Charlie create a shared secret using a conventional SIDH protocol, in which the shared secret is the j-invariant of an elliptic curve $E_{CB}$, which is the image curve under an isogeny $\psi_C \phi_B$. Bob and Charlie may designate this shared secret as their shared broadcasting key.

As shown in FIG. 8, Alice can create an isogeny $\phi_A: E \to E_A$, a basis $\{R, S\}$ and secret integers $\{c, d\}$, for example, as described with respect to 314 in FIG. 3. Alice then sends Bob the image curve $E_A$, two pairs of image points $\{\phi_A(P_B), \phi_A(Q_B)\}, \{\phi_A(P_C), \phi_A(Q_C)\}$ and the basis $\{R, S\}$. (In some cases, Bob may obtain the basis $\{R, S\}$ in another manner, for example, by computing it locally.) Bob then creates a map $\chi_B: E_A \to E_{BA}$, whose kernel is $\phi_A($ker $\phi_B) = \phi_A(P_B) + r_B \phi_A(P_B)$. Bob sends Charlie the image curve $E_{BA}$ and two pairs of image points $\{\chi_B(\phi_A(P_C)), \chi_B(\phi_A(Q_C))\}$ and $\{\chi_B(R), \chi_B(S)\}$. Charlie then creates a map $\chi_C: E_{BA} \to E_{CBA}$, whose kernel is $\chi_B(\phi_A($ker $\phi_C)) = \chi_B(\phi_A(P_C)) + r_C \chi_B(\phi_A(P_C))$. Charlie sends Alice the image curve $E_{CBA}$ and a pair of image points $\{\chi_C(\chi_B(R)), \chi_C(\chi_B(S))\}$. Alice finds an isogeny $\tilde{\phi}_A: E_{CBA} \to E_{\tilde{A}CBA}$, whose kernel is $\chi_C(\chi_B(\phi_A($ker $\phi_B))) = c \chi_C(\chi_B(R)) + d \chi_C(\chi_B(S))$, where $\phi_A(Q_A) = cR + dS$. The j-invariant of the image curve $E_{\tilde{A}CBA}$ gives Alice the same shared secret that was established by Bob and Charlie using SIDH (the j-invariant of $E_{CB}$), which may be used as the shared broadcasting key to decrypt data from Bob and Charlie.

Figure 9:
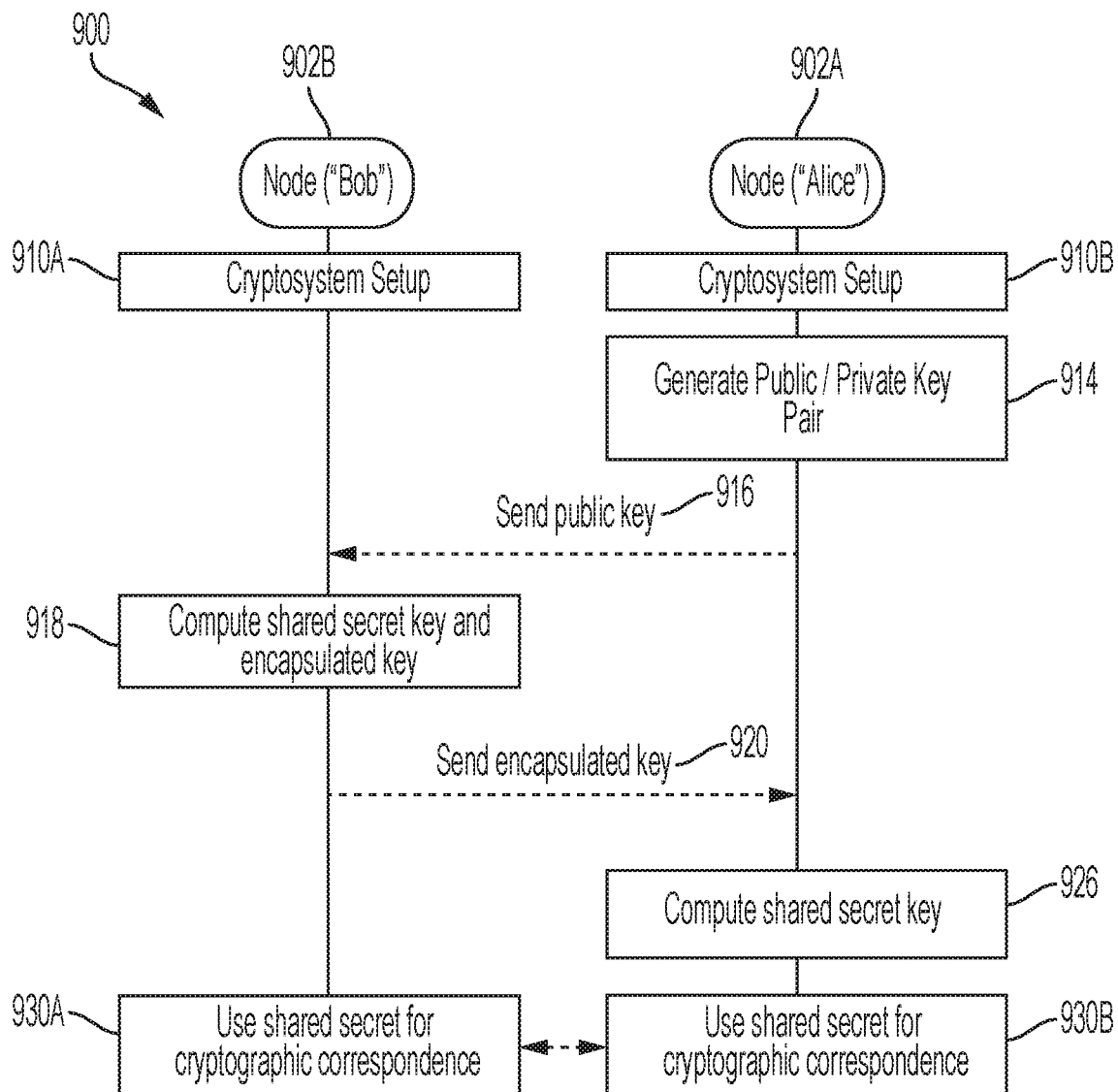
FIG. 9 is a flow diagram showing an example key establishment mechanism (KEM) protocol in a supersingular isogeny-based cryptography system.

FIG. 9 is a flow diagram showing an example key establishment mechanism (KEM) process 900 in a supersingular isogeny-based cryptography system. A KEM protocol is a type of key establishment protocol. At a high level, a KEM protocol executed between two entities (Alice and Bob) may proceed as follows. Alice creates a KEM public/secret key pair (e.g., using a KeyGen function). After obtaining Alice's public key, Bob inputs this public key into the KEM algorithm to create and encapsulate a shared secret key (e.g., using an Encaps function). In particular, the output Bob receives is a plaintext version of the shared secret key and an encapsulated version of the shared secret key. Bob then sends Alice the encapsulated version, and Alice is able to use her secret key to decapsulate the shared secret key (e.g., using a Decaps function). A KEM may be executed in another manner in some cases.

The example cryptographic process 900 can be performed, for example, by computer systems that can exchange information over a communication channel. For instance, operations in the cryptographic process 900 may be performed by the nodes 102, 104 in the example communication system 100 shown in FIG. 1 or in another type of system. The example process 900 may include additional or different operations, including operations performed by additional or different entities, and the operations may be performed in the order shown or in another order.

In some cases, one or more of the operations shown in FIG. 9 are implemented as processes that include multiple operations, sub-processes or other types of routines. In some cases, operations can be combined, performed in parallel, iterated or otherwise repeated or performed in another manner.

The example process 900 shown in FIG. 9 includes operations performed by nodes 902A, 902B. In the example shown, the nodes 902A, 902B represent two distinct entities in a supersingular isogeny-based cryptosystem. The two distinct entities are referred to as "Alice" and "Bob" in FIG. 9. In some examples, "Bob" represents a broadcaster (e.g., a content provider or another type of broadcaster entity), and "Alice" represents a user (e.g., a content subscriber or another type of authorized entity). In the example shown, the nodes 902A, 902B exchange public data, and each node uses the public data provided by the other node to execute the process 900. The nodes 902A, 902B may communicate with each other, for example, directly or indirectly, in each stage of the process 900.

In the example shown in FIG. 9, each entity may correspond to a computing device, a computer system, an IP address or other network address, or another type of computer-readable identifier or instance of a computer resource. Accordingly, the computations and other operations of each entity may be performed by one or more processors or other elements of the respective node 902A, 902B. Similarly, information sent to or received by an entity may be sent to or received by an element (e.g., one or more processors, memories, or interfaces) of the respective node 902A, 902B.

As shown in FIG. 9, the nodes 902A, 902B communicate with each other to execute certain operations in the process 900. In the example shown in FIG. 9, either of the nodes may send information directly to the other node, or a node may initiate transmission indirectly, for example, through a communication device or otherwise. Moreover, information may be sent in multiple transmissions or a single transmission over one or more communication networks or other channels. All or part of the information can be transmitted over a public or private channel, and may in some instances be observed by a quantum-enabled adversary or another type of adversary.

At 910A and 910B, the nodes 902A, 902B perform one or more cryptosystem setup operations. For example, the cryptosystem setup operations may be performed as described with respect to 310A and 310B in FIG. 3 to establish the public parameters ($l_A$, $l_B$, p, E, $P_A$, $Q_A$, $P_B$, $Q_B$).

At 914, node 902A generates a public/private key pair. For example, Alice may generate the public/private key pair by performing operation 314 as described with respect to FIG. 3, and may designate the public key $\{E_A, \phi_A(P_A), \phi_A(Q_A), R, S\}$ and the private key $\{c, d\}$ based on the outputs generated.

At 916, node 902A sends the public key to node 902B. For example, Alice may send the public key $\{E_A, \phi_A(P_A), \phi_A(Q_A), R, S\}$ to Bob.

At 918, node 902B computes the shared secret key and an encapsulated key. For example, Bob may compute the shared secret key and the encapsulated key by performing operations 312, 318 and 324 as described with respect to FIG. 3, and may designate the shared secret key {the j-invariant of the image curve $E_B$} and the encapsulated key $\{E_{BA}, \psi_B(R), \psi_B(S)\}$ based on the outputs generated by the operations.

At 920, node 902B sends the encapsulated key to node 902A. For example, Bob may send Alice the encapsulated key $\{E_{BA}, \psi_B(R), \psi_B(S)\}$.

At 926, node 902A computes the shared secret key. For example, Alice may compute the shared secret key by performing operations 322 and 326 as described with respect to FIG. 3, and may designate the shared secret key {the j-invariant of the image curve $E_{\tilde{A}BA}$} based on the outputs generated by the operations.

At 930A and 930B, the nodes 902A and 902B use the shared secret for cryptographic correspondence. For example, the shared secret may be used in an encryption protocol, a digital signature protocol, etc.

In some cases, the cryptographic correspondence is executed between the nodes 902A, 902B as described with respect to operations 330A and 330B in FIG. 3. For example, Alice and Bob may use a symmetric key that is derived from the shared secret. In some examples, Bob encrypts data with the symmetric key derived from the shared secret, and Alice decrypts the data with the symmetric key derived from the shared secret.

In some implementations, a KEM protocol such as the process 900 shown in FIG. 9 can be implemented using three types of functions. For example, the KEM may include a function (referred to as "KeyGen") to create a public/secret key pair, a function (referred to as "Encaps") to encapsulate a secret key using the public key, and a function (referred to as "Decaps") to retrieve or decapsulate the symmetric key using the secret key. A KEM may include other functions or other types of operations, and the KeyGen, Encaps and Decaps functions may be implemented as described in the examples below or in another manner.

In some examples, at 914 in FIG. 9, Alice uses the following KeyGen function to generate the public/private key pair:
Public Parameters: $l_A$, $l_B$, p E, $P_A$, $Q_A$, $P_B$, $Q_B$)
Operations:
1. Chooses a random seed $r_A$, where $0 < r_A < l_A^{e_A}$.
2. Calculates $K_A = \langle P_A + r_A Q_A \rangle$.
3. Finds an isogeny $\phi_A: E \to E_A$, where $E_A = E/K_A$
4. Calculates $\phi_A(B)$, $\phi_A(Q_B)$, $\phi_A(Q_A)$.
5. Calculates a basis $\{R, S\}$ of $E_A [l_A^{e_A}]$.
6. Calculates secret numbers c and d such that $\phi_A(Q_A) = cR + dS$.
Output: (public key) $E_A$, $\phi_A(B)$, $\phi_A(Q_B)$, R, S (private key) c, d In some examples, at 918 in FIG. 9, Bob uses the following Encaps function to generate the shared secret key and the encapsulated key:
Input: $E_A$, $\phi_A(P_B)$, $\phi_A(Q_B)$, R, S
Operations:
1. Chooses a random seed $r_B$, where $0 \leq r_B \leq l_B^{e_B}$.
2. Creates $K_B = \langle P_B + r_B Q_B \rangle$.
3. Finds an isogeny $\phi_B: E \to E_B$, where $E_B = E/K_B$.
4. Calculates the j-invariant of $E_B$, to get the shared secret.
5. Calculates $K_{BA} = \langle \phi_A(P_B) + r_B \phi_A(Q_B) \rangle$.
6. Finds an isogeny $\psi_B: E_A \to E_{BA}$, where $$E_{BA} = \frac{E_A}{K_{BA}}.$$

7. Calculates $\psi_B(R)$, $\psi_B(S)$.
Output: (shared key) j-invariant of $E_B$ and (encapsulated key) $E_{BA}$, $\psi_B(R)$, $\psi_B(S)$.

Figure 10:
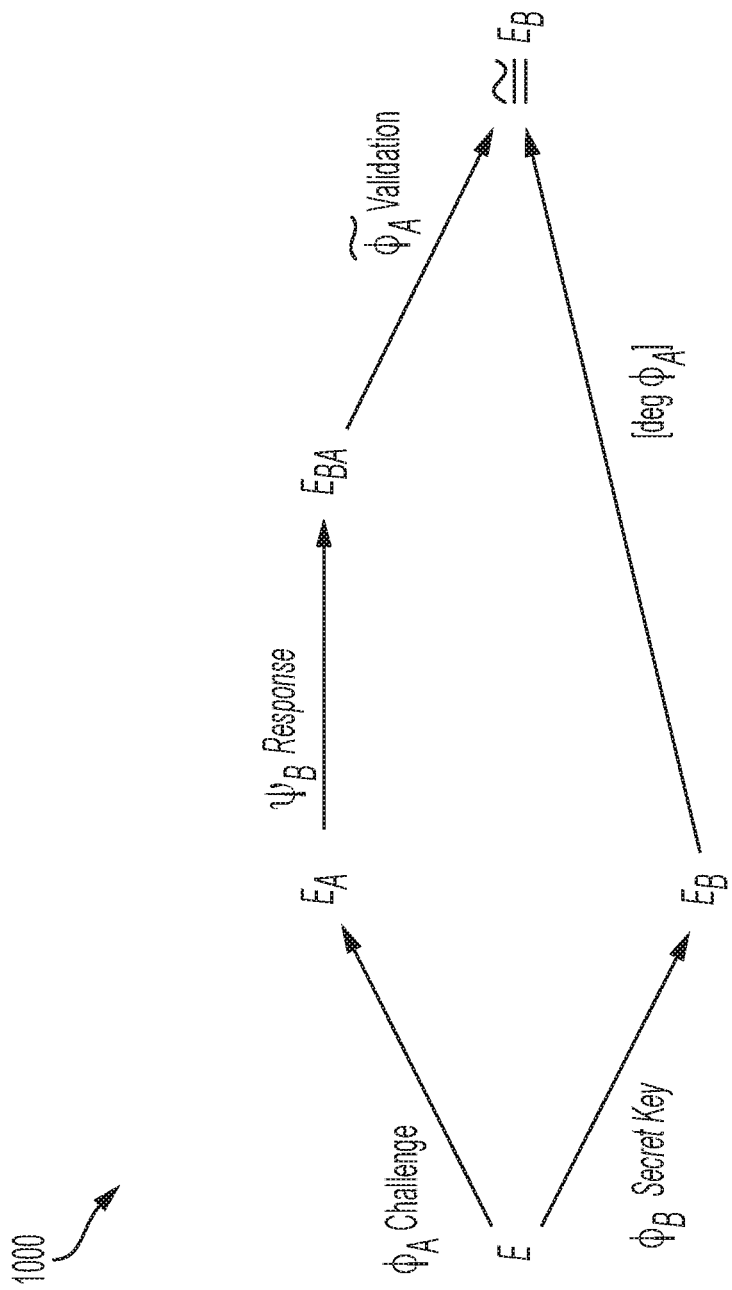
FIG. 10 is a diagram illustrating relationships among mathematical objects in some example supersingular isogeny-based cryptographic protocols.
Figure 11:
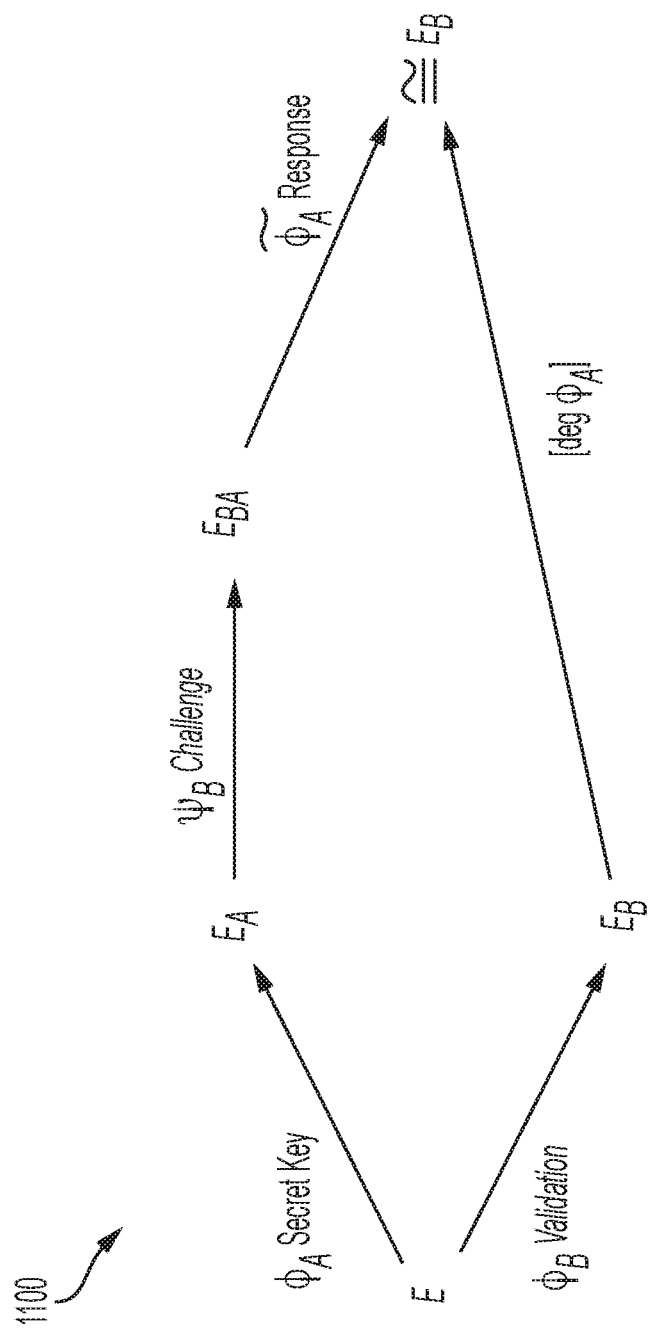
FIG. 11 is a diagram illustrating relationships among mathematical objects in some example supersingular isogeny-based cryptographic protocols.

In some examples, at 926 in FIG. 9, Alice uses the following Decaps function to compute the shared secret key:
Input: (encapsulated key) $E_{BA}$, $\psi_B(R)$, $\psi_B(S)$, (private key) a, b
Operations:
1. Calculates $K_{\tilde{A}BA} = \langle c\psi_B(R) + d\psi_B(S) \rangle$.
2. Finds an isogeny $\phi_{\tilde{A}}: E_{BA} \to E_{\tilde{A}BA}$, where $E_{\tilde{A}BA} = E_{BA}/K_{\tilde{A}BA}$
3. Calculates the j-invariant of $E_{\tilde{A}BA}$, to get the shared secret.
Output: (shared key) j-invariant of $E_{\tilde{A}BA}$ FIGS. 10 and 11 are diagrams illustrating relationships among mathematical objects 1000, 1100 in some example supersingular isogeny-based cryptographic protocols. The example cryptographic protocols represented in FIGS. 10 and 11 are zero-knowledge identification protocols that can utilize the operations discussed above to prove an entity's identity.

In an identification protocol, one entity has a public/secret key pair that the entity uses to prove its identity to another entity. In a zero-knowledge identification protocol, the entity proves its identity without revealing any information about the secret key, and hence the entity can reuse the same public/secret key pair (e.g., indefinitely). In both of the example protocols represented in FIGS. 10 and 11, the verifier has secret information. In the first example protocol (represented in FIG. 10) the verifier computes the dual isogeny, whereas in the second example protocol (represented in FIG. 11) the prover computes the dual isogeny. The mathematical objects 1000, 1100 shown in FIGS. 10 and 11 are described with respect to example entities that may execute isogeny-based cryptographic protocols. While both of these example protocols may be considered ephemeral identity protocols, they could be configured into a static scheme as well. In both example zero-knowledge identification protocols, Bob's public key can be published or otherwise provided to Alice in any suitable manner.

The first example zero-knowledge identification protocol is represented in FIG. 10. In this example, an entity (referred to as "Bob") wishes to prove his identity to another entity (referred to as "Alice"), and the protocol proceeds as follows: Bob creates a public key by completing operation 312 in FIG. 3, designating $E_B$ as Bob's public key, and designating $r_B$ as Bob's secret key. Alice issues a challenge by completing operations 314 and 316 in FIG. 3, designating the cryptographic objects sent to Bob at 316 as the challenge. Bob then generates a response to Alice's challenge and sends the response to Alice by completing operations 318 and 320 in FIG. 3, designating the cryptographic objects sent to Alice at 320 as the response. Alice then validates Bob's response by performing operation 322 in FIG. 3, and determining whether $E_{\tilde{A}BA} \cong E_B$ (e.g., whether the j-invariant of $E_{\tilde{A}BA}$ equals the j-invariant of $E_B$). If $E_{\tilde{A}BA} \not\cong E_B$, then Alice accepts Bob's identity. If $E_{\tilde{A}BA} \cong E_B$, then Alice does not accept Bob's identity.

The second example zero-knowledge identification protocol is represented in FIG. 11. In this example, an entity (referred to as "Alice") wishes to prove her identity to another entity (referred to as "Bob"), and the protocol proceeds as follows: The first example zero-knowledge identification protocol is represented in FIG. 10. In this example, an entity (referred to as "Bob") wishes to prove his identity to another entity (referred to as "Alice"), and the protocol proceeds as follows:

Alice creates a public key by completing operation 314 in FIG. 3, designating $E_A$ as Alice's public key, and designating $r_A$ as Alice's secret key. Bob issues a challenge by choosing a random seed $r_B$, where $0 \leq r_B \leq l_B^{B_e}$ and completing operations 318 and 320 in FIG. 3, designating the cryptographic objects sent to Alice at 320 as the challenge. Alice then generates a response to Bob's challenge and sends the response to Bob by completing operation 322 in FIG. 3, and sending the image curve $E_{\tilde{A}BA}$ to Bob as the response. Bob then validates Alice's response by performing operation 312 in FIG. 3 (using the same value of the random seed $r_B$ previously chosen), and determining whether $E_{\tilde{A}BA} \cong E_B$ (e.g., whether the j-invariant of $E_{\tilde{A}BA}$ equals the j-invariant of $E_B$). If $E_{\tilde{A}BA} \cong E_B$, then Bob accepts Alice's identity. If $E_{\tilde{A}BA} \cong E_B$, then Bob does not accept Alice's identity.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of what is described above, an entity obtains a shared secret key from a broadcaster in supersingular isogeny-based cryptosystem. In another general aspect of what is described above, a broadcaster provides a shared secret key in supersingular isogeny-based cryptosystem.

In a first example, a cryptography method includes executing a key establishment protocol between a first entity (e.g., "Alice" in FIG. 3, 5, 7 or 9) and a second entity (e.g., "Bob" in FIG. 3, 5, 7 or 9) to generate a shared secret, and using the shared secret to execute cryptographic correspondence between the first entity and the second entity. Executing the key establishment protocol includes the first entity performing the following operations (e.g., as described with respect to operation 314 in FIG. 3, or otherwise): calculating a first image curve $E_A$ that represents an image of an elliptic curve E under a first isogeny $\phi_A$; calculating a first pair of elliptic curve points $\{(P_B), \phi_A(Q_B)\}$ representing an image of a second pair of elliptic curve points $\{P_B, Q_B\}$ under the first isogeny $\phi_A$; and calculating secret integers $\{c, d\}$ based on the first isogeny $\phi_A$ (e.g., such that $\phi_A(Q_A)=cR+dS$). Executing the key establishment protocol includes the first entity performing the following operations (e.g., as described with respect to operations 316, 320, 322 and 326 in FIG. 3, or otherwise): sending the first image curve $E_A$ and the first pair of elliptic curve points $\{\phi_A(P_B), \phi_A(Q_B)\}$ to the second entity; receiving a second image curve $E_{BA}$ and a third pair of elliptic curve points $\{\psi_B(R), \psi_B(S)\}$ from the second entity; calculating a third image curve $E_{\tilde{A}BA}$ representing an image of the second image curve $E_{BA}$ under a second isogeny $\tilde{\phi}_A$, wherein the second isogeny $\tilde{\phi}_A$ is identified based on the secret integers $\{c, d\}$ and the third pair of elliptic curve points $\{\psi_B(R), \psi_B(S)\}$; and calculating the shared secret based on the third image curve $E_{\tilde{A}BA}$.

In a second example, a computing system includes one or more processors and a computer-readable medium storing instructions that are operable when executed by the one or more processors to perform one or more operations of the first example. In a third example, a computer-readable medium stores instructions that are operable when executed by data processing apparatus to perform one or more operations of the first example.

Implementations of the first, second or third example may include one or more of the following features. The shared secret can be the j-invariant of the third image curve $E_{\tilde{A}BA}$. The key establishment protocol can be a key encapsulation mechanism (KEM) protocol (e.g., as described with respect to FIG. 9). The key establishment protocol comprises can be a broadcast protocol (e.g., as described with respect to FIG. 4). The second pair of elliptic curve points $\{P_B, Q_B\}$ and the elliptic curve E can be public parameters of the supersingular isogeny-based cryptosystem. The first pair of elliptic curve points $\{\phi_A(P_B), \phi_A(Q_B)\}$ can be an image of a basis $\{P_B, Q_B\}$ specified by public parameters of the supersingular isogeny-based cryptosystem.

Implementations of the first, second or third example may include one or more of the following features. A key update protocol can be executed between the first and second entities to generate an updated shared secret, and the updated shared secret can be used to execute cryptographic correspondence between the first entity and the second entity. The key update protocol can be initiated by the second entity independent of additional information from the first entity. The first entity can perform the first entity's side of the key update protocol without sending any additional information to the second entity. Executing the key update protocol can include the first entity performing the following operations (e.g., as described with respect to operations 520, 522 and 526 in FIG. 5, or otherwise): receiving an updated second image curve $E_{B'A}$ and an updated third pair of elliptic curve points $\{P_B(R), \psi_B(S)\}$ from the second entity; calculating an updated third image curve $E_{\tilde{A}B'A}$ representing an image of the updated second image curve $E_{B'A}$ under an updated second isogeny $\tilde{\phi}_{A'}$, wherein the updated second isogeny $\tilde{\phi}_{A'}$ is identified based on the secret integers $\{c, d\}$ and the updated third pair of elliptic curve points $\{\psi_B(R), \psi_B(S)\}$; and calculating the updated shared secret based on the updated third image curve $E_{\tilde{A}B'A}$.

Implementations of the first, second or third example may include one or more of the following features. The second image curve $E_{BA}$ may represent an image of the first image curve $E_A$ under a third isogeny $\psi_B$, and the first isogeny $\phi_A$ and the third isogeny $\psi_B$ can have relatively prime degree. The first entity can obtain a certificate that certifies a public key of the first entity (e.g., as described with respect to FIGS. 6 and 7, or otherwise); the public key can be, for example, the first image curve $E_A$ and the first pair of elliptic curve points $\{\phi_A(P_B), \phi_A(Q_B)\}$. Executing the key establishment protocol can include the first entity sending the certificate to the second entity (e.g., as described with respect to FIGS. 6 and 7, or otherwise).

Implementations of the first, second or third example may include one or more of the following features. The shared secret may be initially computed by the second entity and a third entity (e.g., as described with respect to FIG. 8, or otherwise). Executing the key establishment protocol can include the first entity performing the following operations (e.g., as described with respect to FIG. 8, or otherwise): calculating a fifth pair of elliptic curve points $\{\phi_A(P_C), \phi_A(Q_C)\}$ representing an image of a sixth pair of elliptic curve points $\{P_C, Q_C\}$ under the first isogeny $\phi_A$; and sending the fifth pair of elliptic curve points $\{\phi_A(P_C), \phi_A(Q_C)\}$ to the second entity or the third entity.

Implementations of the first, second or third example may include one or more of the following features. Executing the key establishment protocol may include the first entity calculating a basis $\{R, S\}$ based on the first image curve $E_A$, the basis $\{R, S\}$ comprising a fourth pair of elliptic curve points; and sending the basis $\{R, S\}$ to the second entity. Executing the key establishment protocol can include the first entity choosing the basis $\{R, S\}$ randomly, and solving a discrete log to find the secret integers $\{c, d\}$ based on the basis $\{R, S\}$. Executing the key establishment protocol can include the first entity choosing one of the elliptic curve points in the basis $\{R, S\}$ randomly, choosing one of the secret integers $\{c, d\}$ randomly, and computing the other elliptic curve point in the basis based on the randomly chosen elliptic curve point and the randomly chosen secret integer.

Implementations of the first, second or third example may include one or more of the following features. Executing the key establishment protocol can include the first entity obtaining a random seed $r_A$; identifying the first isogeny $\phi_A$ based on the random seed $r_A$ and the elliptic curve E; and identifying the second isogeny $\phi_A$ based on the secret integers $\{c, d\}$, the third pair of elliptic curve points $\{\psi_B(R), \psi_B(S)\}$, and the second image curve $E_{BA}$. Using the shared secret to execute cryptographic correspondence between the first entity and the second entity can include the first entity: deriving a symmetric key from the shared secret; receiving encrypted data from the second entity; and using the symmetric key to decrypt the encrypted data.

In a fourth example, a cryptography method includes executing a key establishment protocol between a first entity (e.g., "Bob" in FIG. 3, 5, 7 or 9) and a second entity (e.g., "Alice" in FIG. 3, 5, 7 or 9) to generate a shared secret, and using the shared secret to execute cryptographic correspondence between the first entity and the second entity. Executing the key establishment protocol includes the first entity performing the following operations (e.g., as described with respect to operations 312, 316, 318, 320 and 324 in FIG. 3, or otherwise): calculating a first image curve $E_B$ representing an image of an elliptic curve E under a first isogeny $\phi_B$; calculating the shared secret based on the first image curve $E_B$; receiving a second image curve $E_A$ and a first pair of elliptic curve points $\{\phi_A(P_B), \phi_A(Q_B)\}$ from a second entity; obtaining a basis $\{R, S\}$ comprising a second pair of elliptic curve points; calculating a third image curve $E_{BA}$ representing an image of the second image curve $E_A$ under a second isogeny $\psi_B$; calculating a third pair of elliptic curve points $\{\psi_B(R), \psi_B(S)\}$ based on the basis $\{R, S\}$ and the second isogeny $P_B$; and sending the third image curve $E_{BA}$ and the third pair of elliptic curve points $\{\psi_B(R), \psi_B(S)\}$ to the second entity, wherein the third image curve $E_{BA}$ and the third pair of elliptic curve points $\{\psi_B(R), \psi_B(S)\}$ enable the second entity to compute the shared secret.

In a fifth example, a computing system includes one or more processors and a computer-readable medium storing instructions that are operable when executed by the one or more processors to perform one or more operations of the fourth example. In a sixth example, a computer-readable medium stores instructions that are operable when executed by data processing apparatus to perform one or more operations of the fourth example.

Implementations of the fourth, fifth or sixth example may include one or more of the following features. The first pair of elliptic curve points $\{\phi_A(P_B), \phi_A(Q_B)\}$ can be an image of a basis $\{P_B, Q_B\}$ specified by public parameters of the supersingular isogeny-based cryptosystem. The elliptic curve E can be a public parameter of the supersingular isogeny-based cryptosystem. The shared secret can be the j-invariant of the first image curve $E_B$. The key establishment protocol can be a key encapsulation mechanism (KEM) protocol (e.g., as described with respect to FIG. 9). The key establishment protocol can be a broadcast protocol (e.g., as described with respect to FIG. 4). For instance, the first entity may perform multiple executions of the key establishment protocol with multiple entities to generate the same shared secret with each respective entity (e.g., as described with respect to FIG. 4).

Implementations of the fourth, fifth or sixth example may include one or more of the following features. A key update protocol can be executed between the first and second entities to generate an updated shared secret, and the updated shared secret can be used to execute cryptographic correspondence between the first entity and the second entity. The key update protocol can be initiated by the first entity independent of additional information from the second entity, and the first entity does not need any additional information from the second entity to complete the first entity's side of the key update protocol. Executing the key update protocol can include the first entity performing the following operations (e.g., as described with respect to operations 512, 518, 520 and 524 in FIG. 5, or otherwise): calculating an updated first image curve $E_{B'}$, representing an image of the elliptic curve E under an updated first isogeny $\phi_{B'}$; calculating the updated shared secret based on the updated first image curve $E_{B'}$; calculating an updated third image curve $E_{B'A}$ representing an image of the second image curve $E_A$ under an updated second isogeny $\psi_{B'}$; calculating an updated third pair of elliptic curve points $\{\psi_{B'}(R), \psi_{B'}(S)\}$ based on the basis $\{R, S\}$ and the updated second isogeny $\psi_{B'}$; sending the updated third image curve $E_{B'A}$ and the updated third pair of elliptic curve points $\{\psi_{B'}(R), \psi_{B'}(S)\}$ to the second entity, wherein the updated third image curve $E_{B'A}$ and the updated third pair of elliptic curve points $\{\psi_{B'}(R), \psi_{B'}(S)\}$ enable the second entity to compute the updated shared secret.

Implementations of the fourth, fifth or sixth example may include one or more of the following features. Obtaining the basis $\{R, S\}$ may include receiving the basis from the second entity or computing the basis according to a protocol.

Implementations of the fourth, fifth or sixth example may include one or more of the following features. The execution of the key establishment protocol comprises the first entity receiving a certificate from the second entity; and verifying a public key of the second entity based on the certificate (e.g., as described with respect to FIGS. 6 and 7, or otherwise). For example, the public key of the second entity can include the second image curve $E_A$ and the first pair of elliptic curve points $\{\phi_A(P_B), \phi_A(Q_B)\}$. Executing the key establishment protocol can include the first entity obtaining a random seed $r_B$, and identifying the first isogeny $\phi_B$ based on the random seed $r_B$ and the elliptic curve E.

Implementations of the fourth, fifth or sixth example may include one or more of the following features. Using the shared secret to execute cryptographic correspondence between the first entity and the second entity can include the first entity deriving a symmetric key from the shared secret; using the symmetric key to encrypt data; and sending the encrypted data to the second entity. The first entity may send the same encrypted data to several authorized users, which include the first entity.

In a seventh example, a broadcasting method includes the following operations performed by one or more computer devices: one party (the broadcaster) creates a shared key—the image of an isogeny or a value based on the image; each user creates a public/secret key pair—the secret key is the kernel of an isogeny and the public key is the image of the isogeny; the broadcaster computes the image under an isogeny (where this isogeny is related to the broadcaster's secret key) of the user's public key, and sends it to the user; the user uses this image to calculate the broadcaster's shared key by essentially undoing their first isogeny.

Implementations of the seventh example may include one or more of the following features. The shared key is updated without the user needing to send any additional information to the broadcaster. Isogenies of the user and broadcaster have relatively prime degree (the isogenies do not have to be powers of 2 and 3). The torsion points have relatively prime degree (they do not have to be powers of a prime). The shared secret used by the broadcaster is created by multiple parties. The user's public key is first verified as valid. Each user's public key is verified by a third party. The method can be performed as a KEM as described above. The method can include finding elliptic curve points forming a basis $\{R, S\}$ and secret integers $\{c, d\}$. The basis $\{R, S\}$ can be random point, and secret integers $\{c, d\}$ can be found by solving a discrete log. A random point R can be found, and then another point S can be a specific linear combination of R and $\phi_A(P_A)$.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A cryptography method comprising:
   executing a key establishment protocol to generate a shared secret, wherein executing the key establishment protocol comprises a first entity executing the following operations:
   calculating a first image curve representing an image of an elliptic curve under a first isogeny;
   calculating the shared secret based on the first image curve, wherein the shared secret is calculated by the first entity independent of information from a second entity;
   receiving, from the second entity, a second image curve and a first pair of elliptic curve points;
   obtaining a basis comprising a second pair of elliptic curve points;
   calculating a third image curve representing an image of the second image curve under a second isogeny;
   calculating a third pair of elliptic curve points based on the basis and the second isogeny; and
   sending, to the second entity, the third image curve and the third pair of elliptic curve points, wherein the third image curve and the third pair of elliptic curve points enable the second entity to compute the shared secret; and
   using the shared secret to execute cryptographic correspondence between the first entity and the second entity.

2. The cryptography method of claim 1, wherein calculating the shared secret comprises calculating the j-invariant of the first image curve.

3. The cryptography method of claim 1, wherein executing the key establishment protocol comprises executing a key encapsulation mechanism (KEM) protocol.

4. The cryptography method of claim 1, wherein executing the key establishment protocol comprises executing a broadcast protocol.

5. The cryptography method of claim 1, wherein the first entity performs multiple executions of the key establishment protocol with multiple entities to generate the same shared secret with each respective entity.

6. The cryptography method of claim 1, comprising:
   executing a key update protocol to generate an updated shared secret, wherein executing the key update protocol comprises the first entity executing the following operations:
   calculating an updated first image curve representing an image of the elliptic curve under an updated first isogeny;
   calculating the updated shared secret based on the updated first image curve;
   calculating an updated third image curve representing an image of the second image curve under an updated second isogeny;
   calculating an updated third pair of elliptic curve points based on the basis and the updated second isogeny; and
   sending, to the second entity, the updated third image curve and the updated third pair of elliptic curve points, wherein the updated third image curve and the updated third pair of elliptic curve points enable the second entity to compute the updated shared secret; and
   using the updated shared secret to execute cryptographic correspondence between the first entity and the second entity.

7. The cryptography method of claim 6, wherein the execution of the key update protocol is initiated by the first entity independent of additional information from the second entity.

8. The cryptography method of claim 1, wherein the key establishment protocol comprises the first entity executing the following operations:

receiving a certificate from the second entity; and
verifying a public key of the second entity based on the certificate, the public key comprising the second image curve and the first pair of elliptic curve points.

9. The cryptography method of claim 1, wherein executing the key establishment protocol comprises the first entity executing the following operations:
obtaining a random seed; and
identifying the first isogeny based on the random seed and the elliptic curve.

10. The cryptography method of claim 1, wherein using the shared secret to execute cryptographic correspondence between the first entity and the second entity comprises the first entity executing the following operations:
deriving a symmetric key from the shared secret;
using the symmetric key to encrypt data; and
sending the encrypted data to the second entity.

11. A computer device comprising:
one or more processors; and
memory storing instructions that, when executed, cause the one or more processors to perform operations comprising:
executing a key establishment protocol to generate a shared secret, wherein executing the key establishment protocol comprises a first entity executing the following operations:
calculating a first image curve representing an image of an elliptic curve under a first isogeny;
calculating the shared secret based on the first image curve, wherein the shared secret is calculated by the first entity independent of information from a second entity;
receiving, from the second entity, a second image curve and a first pair of elliptic curve points;
obtaining a basis comprising a second pair of elliptic curve points;
calculating a third image curve representing an image of the second image curve under a second isogeny;
calculating a third pair of elliptic curve points based on the basis and the second isogeny; and
sending, to the second entity, the third image curve and the third pair of elliptic curve points, wherein the third image curve and the third pair of elliptic curve points enable the second entity to compute the shared secret; and
using the shared secret to execute cryptographic correspondence between the first entity and the second entity.

12. The computer device of claim 11, wherein the shared secret is the j-invariant of the first image curve.

13. The computer device of claim 11, wherein the key establishment protocol is a key encapsulation mechanism (KEM) protocol.

14. The computer device of claim 11, wherein the key establishment protocol is a broadcast protocol.

15. The computer device of claim 11, wherein the operations comprise the first entity performing multiple executions of the key establishment protocol with multiple entities to generate the same shared secret with each respective entity.

16. The computer device of claim 11, wherein the operations comprise:
executing a key update protocol to generate an updated shared secret, wherein executing the key update protocol comprises the first entity executing the following operations:
calculating an updated first image curve representing an image of the elliptic curve under an updated first isogeny;
calculating the updated shared secret based on the updated first image curve;
calculating an updated third image curve representing an image of the second image curve under an updated second isogeny;
calculating an updated third pair of elliptic curve points based on the basis and the updated second isogeny; and
sending, to the second entity, the updated third image curve and the updated third pair of elliptic curve points, wherein the updated third image curve and the updated third pair of elliptic curve points enable the second entity to compute the updated shared secret; and
using the updated shared secret to execute cryptographic correspondence between the first entity and the second entity.

17. The computer device of claim 16, wherein the operations comprise the first entity initiating execution of the key update protocol independent of additional information from the second entity.

18. The computer device of claim 11, wherein the key establishment protocol comprises the first entity executing the following operations:
receiving a certificate from the second entity; and
verifying a public key of the second entity based on the certificate, the public key comprising the second image curve and the first pair of elliptic curve points.

19. The computer device of claim 11, wherein executing the key establishment protocol comprises the first entity executing the following operations:
obtaining a random seed; and
identifying the first isogeny based on the random seed and the elliptic curve.

20. The computer device of claim 11, wherein using the shared secret to execute cryptographic correspondence between the first entity and the second entity comprises the first entity executing the following operations:
deriving a symmetric key from the shared secret;
using the symmetric key to encrypt data; and
sending the encrypted data to the second entity.

21. A non-transitory computer-readable medium storing instructions that are operable when executed by data processing apparatus to perform operations comprising:
executing a key establishment protocol to generate a shared secret, wherein executing the key establishment protocol comprises a first entity executing the following operations:
calculating a first image curve representing an image of an elliptic curve under a first isogeny;
calculating the shared secret based on the first image curve, wherein the shared secret is calculated by the first entity independent of information from a second entity;
receiving, from the second entity, a second image curve and a first pair of elliptic curve points;
obtaining a basis comprising a second pair of elliptic curve points;
calculating a third image curve representing an image of the second image curve under a second isogeny;
calculating a third pair of elliptic curve points based on the basis and the second isogeny; and
sending, to the second entity, the third image curve and the third pair of elliptic curve points, wherein the third image curve and the third pair of elliptic curve points enable the second entity to compute the shared secret; and using the shared secret to execute cryptographic correspondence between the first entity and the second entity.

22. The non-transitory computer-readable medium of claim 21, wherein calculating the shared secret comprises calculating the j-invariant of the first image curve.

23. The non-transitory computer-readable medium of claim 21, wherein executing the key establishment protocol comprises executing a key encapsulation mechanism (KEM) protocol.

24. The non-transitory computer-readable medium of claim 21, wherein executing the key establishment protocol comprises executing a broadcast protocol.

25. The non-transitory computer-readable medium of claim 21, wherein the operations comprise the first entity performing multiple executions of the key establishment protocol with multiple entities to generate the same shared secret with each respective entity.

26. The non-transitory computer-readable medium of claim 21, wherein the operations comprise:

executing a key update protocol to generate an updated shared secret, wherein executing the key update protocol comprises the first entity executing the following operations:

calculating an updated first image curve representing an image of the elliptic curve under an updated first isogeny;

calculating the updated shared secret based on the updated first image curve;

calculating an updated third image curve representing an image of the second image curve under an updated second isogeny;

calculating an updated third pair of elliptic curve points based on the basis and the updated second isogeny; and sending, to the second entity, the updated third image curve and the updated third pair of elliptic curve points, wherein the updated third image curve and the updated third pair of elliptic curve points enable the second entity to compute the updated shared secret; and using the updated shared secret to execute cryptographic correspondence between the first entity and the second entity.

27. The non-transitory computer-readable medium of claim 26, wherein the operations comprise the first entity initiating execution of the key update protocol independent of additional information from the second entity.

28. The non-transitory computer-readable medium of claim 21, wherein the key establishment protocol comprises the first entity executing the following operations:

receiving a certificate from the second entity; and verifying a public key of the second entity based on the certificate, the public key comprising the second image curve and the first pair of elliptic curve points.

29. The non-transitory computer-readable medium of claim 21, wherein executing the key establishment protocol comprises the first entity executing the following operations:

obtaining a random seed; and identifying the first isogeny based on the random seed and the elliptic curve.

30. The non-transitory computer-readable medium of claim 21, wherein using the shared secret to execute cryptographic correspondence between the first entity and the second entity comprises the first entity executing the following operations:

deriving a symmetric key from the shared secret;

using the symmetric key to encrypt data; and sending the encrypted data to the second entity.

* * * * *

UNITED STATES PATENT AND TRADEMARK OFFICE
CERTIFICATE OF CORRECTION

PATENT NO. : 10,880,278 B1
APPLICATION NO. : 16/591980
DATED : December 29, 2020
INVENTOR(S) : de Quehen et al.

Page 1 of 2

It is certified that error appears in the above-identified patent and that said Letters Patent is hereby corrected as shown below:

In the Specification

Column 3, Line 25, Delete "$1_A{}^{e_A}1_B{}^{e_B} \pm 1$," and insert -- $l_A{}^{e_A} l_B{}^{e_B} f \pm 1$, -- therefor Column 8, Line 39, Delete "$E_A$," and insert -- $E_{A_i}$ -- therefor Column 8, Line 42, Delete "$E_A$," and insert -- $E_{A_i}$ -- therefor Column 8, Line 42, Delete "$A_L$." and insert -- $A_i$. -- therefor Column 10, Line 17, Delete "$\{\phi_A(B), \phi_A(Q_B)\}$" and insert -- $\{\phi_A(P_B), \phi_A(Q_B)\}$ -- therefor Column 10, Line 27, Delete "P(S)," and insert -- $\psi_B(S)$, -- therefor Column 10, Line 37, Delete "$\langle C\psi_B(R) + d\psi_B(S) \rangle$," and insert -- $\langle c\psi_B(R) + d\psi_B(S) \rangle$ -- therefor Column 11, Line 10, Delete "$K_A \langle P_A + r_A Q_A \rangle$." and insert -- $K_A = \langle P_A + r_A Q_A \rangle$. -- therefor Column 11, Line 36, Delete "$\phi_B: E_A \to E_{BA}$," and insert -- $\psi_B: E_A \to E_{BA}$, -- therefor Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,880,278 B1

Column 18, Line 53, Delete "$\phi_A(B)$," and insert -- $\phi_A(Q_B)$, -- therefor Column 19, Line 6, Delete "$K_{\tilde{A}BA} = \langle c\psi_B(R) + d\psi_B(S) \rangle ..$" and insert -- $K_{\tilde{A}BA} = \langle c\psi_B(R) + d\psi_B(S) \rangle.$ -- therefor Column 22, Line 12, Delete "$\phi_A(B)$," and insert -- $\phi_A(P_B)$, -- therefor Column 22, Line 16, Delete "$E_A$, $\phi_A(B)$, $\phi_A(Q_B)$, R, S" and insert -- $E_A$, $\phi_A(P_B)$, $\phi_A(Q_B)$, R, S -- therefor Column 23, Line 24, Delete "$E_{\tilde{A}BA} \pm E_B$," and insert -- $E_{\tilde{A}BA} \cong E_B$, -- therefor Column 23, Line 25, Delete "$E_{\tilde{A}BA} \cong E_B$," and insert -- $E_{\tilde{A}BA} \not\cong E_B$, -- therefor Column 23, Line 50, Delete "$E_{\tilde{A}BA} \cong E_B$," and insert -- $E_{\tilde{A}BA} \not\cong E_B$, -- therefor Column 24, Line 50, Delete "byway" and insert -- by way -- therefor Column 25, Line 55, Delete "$\{(P_B), \phi_A(Q_B)\}$" and insert -- $\{\phi_A(P_B), \phi_A(Q_B)\}$ -- therefor Column 26, Line 1, Delete "$P_A$," and insert -- $\tilde{\phi}_A$, -- therefor Column 26, Line 1, Delete "OA" and insert -- $\tilde{\phi}_A$ -- therefor Column 26, Line 41, Delete "$\{P_B(R), \psi_B(S)\}$" and insert -- $\{\psi_B(R), \psi_B(S)\}$ -- therefor Column 27, Line 55, Delete "$P_B$;" and insert -- $\psi_B$; -- therefor